US012616265B2

(12) United States Patent (10) Patent No.: US 12,616,265 B2

Teetzel et al. (45) Date of Patent: May 5, 2026

(54) BRIDGE LINK BATTERY SYSTEM FOR HELMET MOUNT ASSEMBLY

(71) Applicant: WILCOX INDUSTRIES CORP., Newington, NH (US)

(72) Inventors: James W. Teetzel, Portsmouth, NH (US); Elliott S. Turner, Newmarket, NH (US)

(73) Assignee: Wilcox Industries Corp., Newington, NH (US)

( * ) Notice: Subject to any disclaimer, the term of this patent is extended or adjusted under 35 U.S.C. 154(b) by 125 days.

(21) Appl. No.: 18/614,070

(22) Filed: Mar. 22, 2024

(65) Prior Publication Data

US 2024/0315372 A1 Sep. 26, 2024

Related U.S. Application Data

(60) Provisional application No. 63/454,691, filed on Mar. 26, 2023.

(51) Int. Cl.
*A42B 3/04* (2006.01)
*H01M 50/262* (2021.01)
(Continued)

(52) U.S. Cl.
CPC ......... *A42B 3/0406* (2013.01); *H01M 50/262* (2021.01); *H01M 50/284* (2021.01);
(Continued)

(58) Field of Classification Search
None
See application file for complete search history.

(56) References Cited

U.S. PATENT DOCUMENTS 11,452,328 B2 9/2022 Franzino et al.
2005/0174753 A1* 8/2005 Cao ........................ A42B 3/044
362/802
(Continued)

FOREIGN PATENT DOCUMENTS

AU 2017398427 A1 8/2018
CA 2524510 A1 4/2007
(Continued)

OTHER PUBLICATIONS

Extended European Search Report in Application No. 2321777 4.1 dated Jun. 27, 2024, 6 pages.
(Continued)

*Primary Examiner* — Thomas S Mccormack
(74) *Attorney, Agent, or Firm* — McLane Middleton, Professional Association

(57) ABSTRACT

A bridge link battery interface for a helmet accessory mounting system includes a housing enclosing a circuit and an electrical and mechanical coupling interface structured and operable to connect to an attachment point on the helmet accessory mounting system. A first battery interface is configured for detachable coupling to a first battery pack and a second battery interface configured for detachable coupling to a second battery pack. First and second electrical connector assemblies are disposed on the housing and electrically coupled to the circuit, wherein the circuit is operable to selectively electrically couple the first and second battery interfaces to the first and second electrical connector assemblies.

37 Claims, 42 Drawing Sheets

(51) Int. Cl.
    *H01M 50/284*     (2021.01)
    *H01M 50/298*     (2021.01)
    *H01M 50/54*     (2021.01)

(52) U.S. Cl.
    CPC ......... *H01M 50/298* (2021.01); *H01M 50/54*
        (2021.01); *H01M 2220/00* (2013.01)

(56)             References Cited

U.S. PATENT DOCUMENTS

| | | |
|---|---|---|
| 2008/0170838 A1 | 7/2008 | Teetzel et al. |
| 2009/0077721 A1* | 3/2009 | Prendergast .............. F41H 1/08 |
| | | 2/209.13 |
| 2019/0101359 A1* | 4/2019 | Zimmer ................ A42B 3/306 |
| 2020/0329806 A1 | 10/2020 | Wong |
| 2022/0071336 A1 | 3/2022 | Franzino et al. |
| 2023/0046229 A1 | 2/2023 | Moore |
| 2024/0204328 A1 | 6/2024 | Teetzel et al. |

FOREIGN PATENT DOCUMENTS

| | | | |
|---|---|---|---|
| EP | 4406443 | A1 | 7/2024 |
| EP | 4437894 | A1 | 10/2024 |

OTHER PUBLICATIONS

Extended European Search Report in Application No. 24166170.1
dated Aug. 28, 2024, 9 pages.

* cited by examiner

176

132

176

376

372

132

372

376

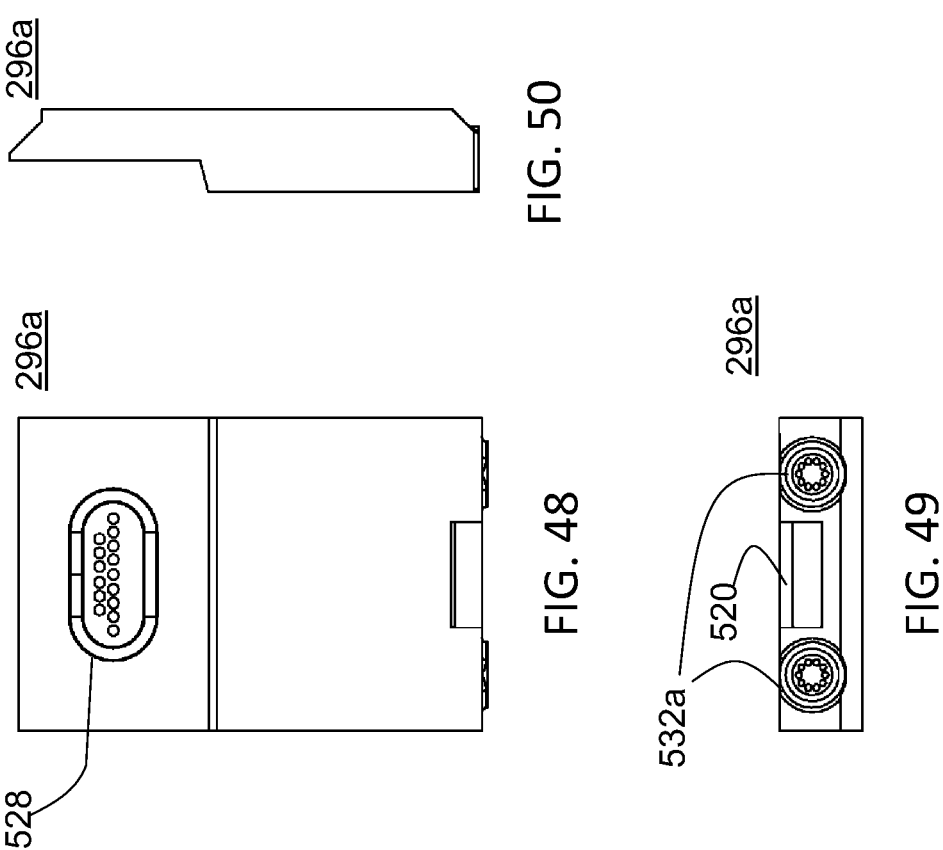
296a
528
FIG. 48
296a
FIG. 50
296a
532a
520
FIG. 49
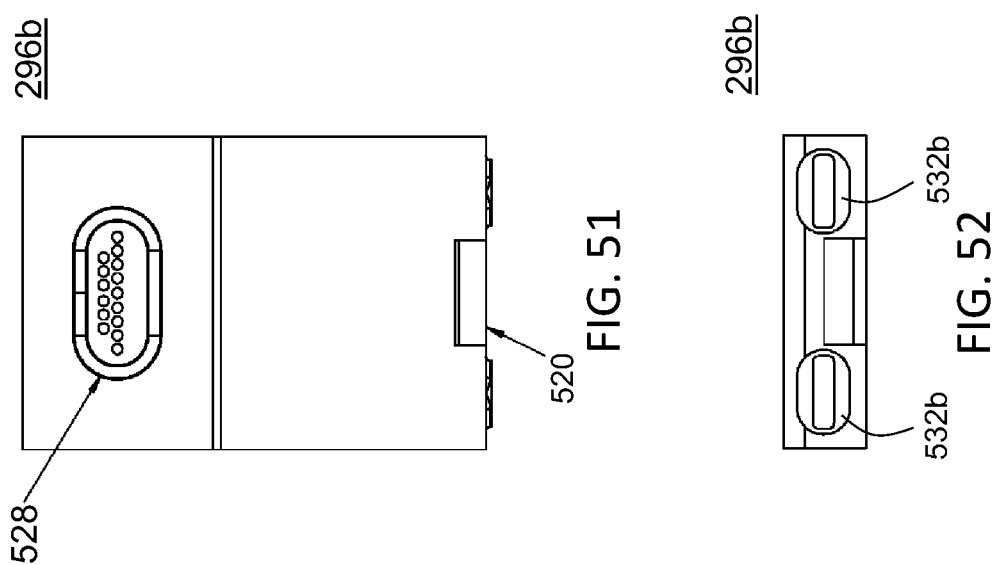
296b
528
FIG. 51
520
296b
532b
532b
FIG. 52

BRIDGE LINK BATTERY SYSTEM FOR HELMET MOUNT ASSEMBLY

RELATED APPLICATION

This application claims the priority benefit of U.S. provisional application Ser. No. 63/454,691 filed Mar. 26, 2023. The aforementioned application is incorporated herein by reference in its entirety.

INCORPORATION BY REFERENCE

The subject matter of this application is related to U.S. provisional application Ser. No. 63/433,661 filed Dec. 19, 2022, and U.S. nonprovisional application Ser. No. 18/544, 128 filed Dec. 18, 2023. Each of the aforementioned applications is incorporated herein by reference in its entirety.

BACKGROUND

The present disclosure relates to a bridge link battery interface for providing power, data, and/or control signal bridge for connecting multiple branches of a helmet accessory mounting system.

SUMMARY

In one aspect, a bridge link battery interface for a helmet accessory mounting system includes a housing enclosing a circuit and an electrical and mechanical coupling interface structured and operable to connect to an attachment point on the helmet accessory mounting system. A first battery interface is configured for detachable coupling to a first battery pack and a second battery interface is configured for detachable coupling to a second battery pack. A first electrical connector assembly is disposed on the housing and electrically coupled to the circuit. A second electrical connector assembly is disposed on the housing and electrically coupled to the circuit. The circuit is operable to selectively electrically couple the first and second battery interfaces to the first and second electrical connector assemblies.

In a more limited aspect, the electrical and mechanical coupling interface is a hot shoe receptacle structured and operable to detachably connect to a hot shoe assembly on the helmet accessory mounting system.

In another more limited aspect, the circuit is operable to couple the first electrical connector assembly to the second electrical connector assembly.

In another more limited aspect, the circuit comprises a switch for selectively coupling a selected one of the first and second battery interfaces to the first and second electrical connector assemblies.

In another more limited aspect, the bridge link battery interface further comprises first and second adapters, wherein the first adapter has a first interface surface configured for removable attachment to the battery interface and a second interface surface configured for removable attachment to the first battery pack and the second adapter has a third interface surface configured for removable attachment to the second battery interface and a fourth interface surface configured for removable attachment to the second battery pack.

In another more limited aspect, each of the second and fourth interface surfaces are configured to detachably couple to a STUB battery.

In another more limited aspect, the first and second adapters are hinged.

In another more limited aspect, the first electrical connector assembly is configured to mate with a first ear bracket connector assembly on a first helmet ear accessory mounting bracket and the second electrical connector assembly is configured to mate with a second ear bracket connector assembly on a second helmet ear accessory mounting bracket.

In another more limited aspect, the circuit is configured to electrically bridge the first and second helmet ear accessory mounting brackets.

In another more limited aspect, the circuit is configured to transmit one or both of data and control signals between the first and second helmet ear accessory mounting brackets.

In another more limited aspect, the bridge link battery interface further includes the helmet accessory mounting system.

In another more limited aspect, the helmet accessory mounting system comprises the first and second ear brackets.

In another more limited aspect, the helmet accessory mounting system comprises a helmet-mounted identification friend foe (IFF) emitter electrically coupled to the circuit.

In another more limited aspect, the bridge link battery interface further comprises the helmet accessory mounting system and a helmet.

In another more limited aspect, the attachment point is a hot shoe interface disposed on a rear of the helmet, and further wherein the helmet accessory mounting system includes a front shroud, a cable cover extending between the front shroud and between and the electrical hot shoe interface; and circuitry within the cable cover for routing power, data, and control signals to the front shroud.

In another more limited aspect, the bridge link battery interface further comprises a processing unit configured to execute program instructions and a memory storing instructions executable by the processing unit.

In another more limited aspect, wherein the processing unit is disposed within a modular processing board cartridge which is detachably coupled to the bridge link battery interface housing.

In another more limited aspect, the bridge link battery interface further comprises one or both of an RF communication interface configured to receive programming data wirelessly and store the programming data in the memory for configuring one or more operational parameters of the modular processing board cartridge and an RFID reader configured to communicate with an RFID token or tag, wherein the processing unit is further configured to receive programming data from the RFID token or tag via the RFID reader and store the programming data in the memory for configuring one or more operational parameters of the modular processing board cartridge.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 48 is a front view of a first interchangeable cartridge embodiment.

FIG. 49 is a bottom view of the cartridge embodiment appearing in FIG. 48.

FIG. 50 is a side view of the cartridge embodiment appearing in FIG. 48.

FIG. 51 is a front view of a second interchangeable cartridge embodiment.

FIG. 52 is a bottom view of the cartridge embodiment appearing in FIG. 53.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

Figure 1:
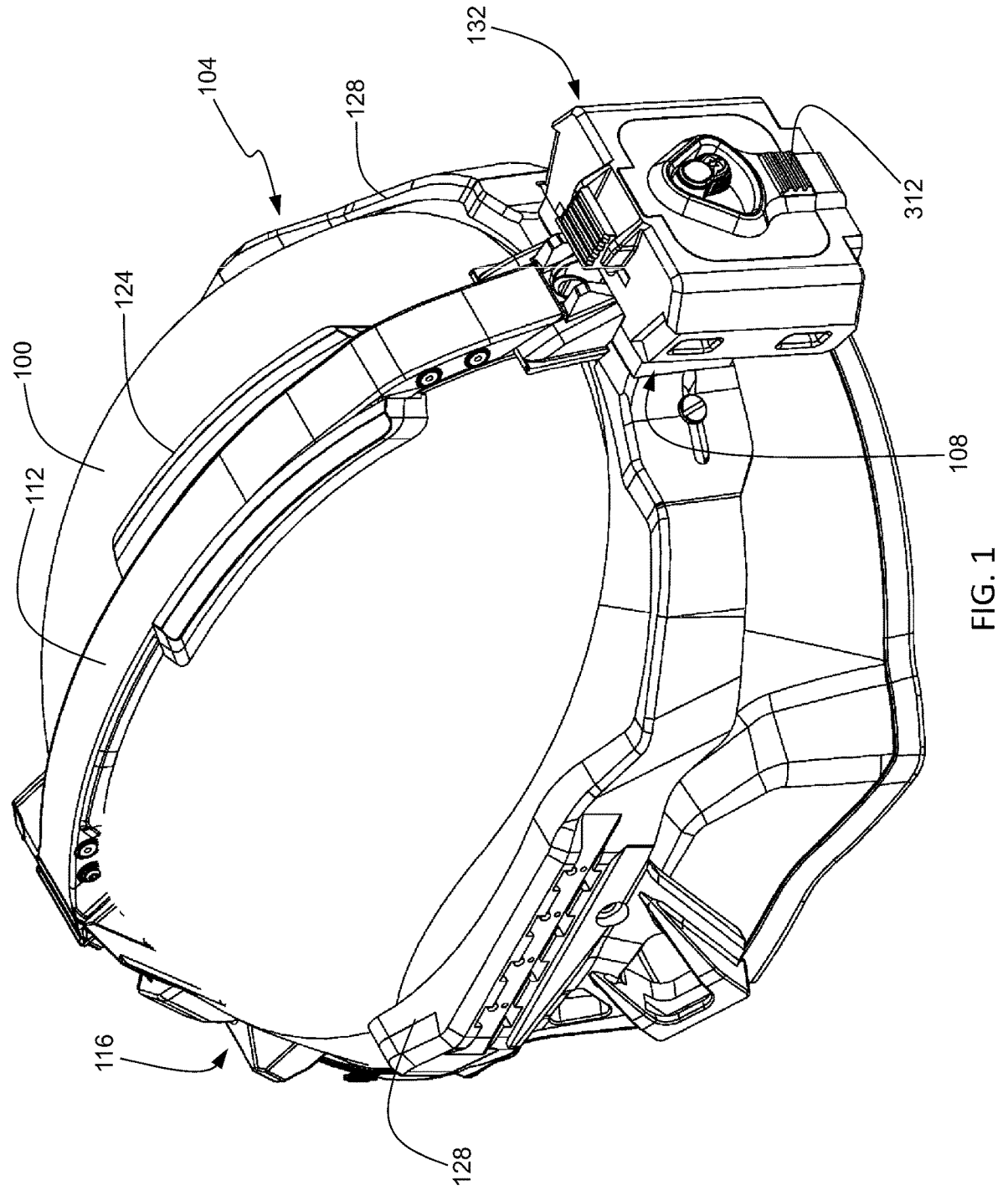
FIG. 1 is an isometric view of an exemplary embodiment powered helmet mounting assembly attached to a helmet taken generally from the rear and left side, the powered helmet mounting assembly having a first embodiment battery pack center base module attached to a rear mount assembly of the powered helmet mounting assembly.
Figure 2:
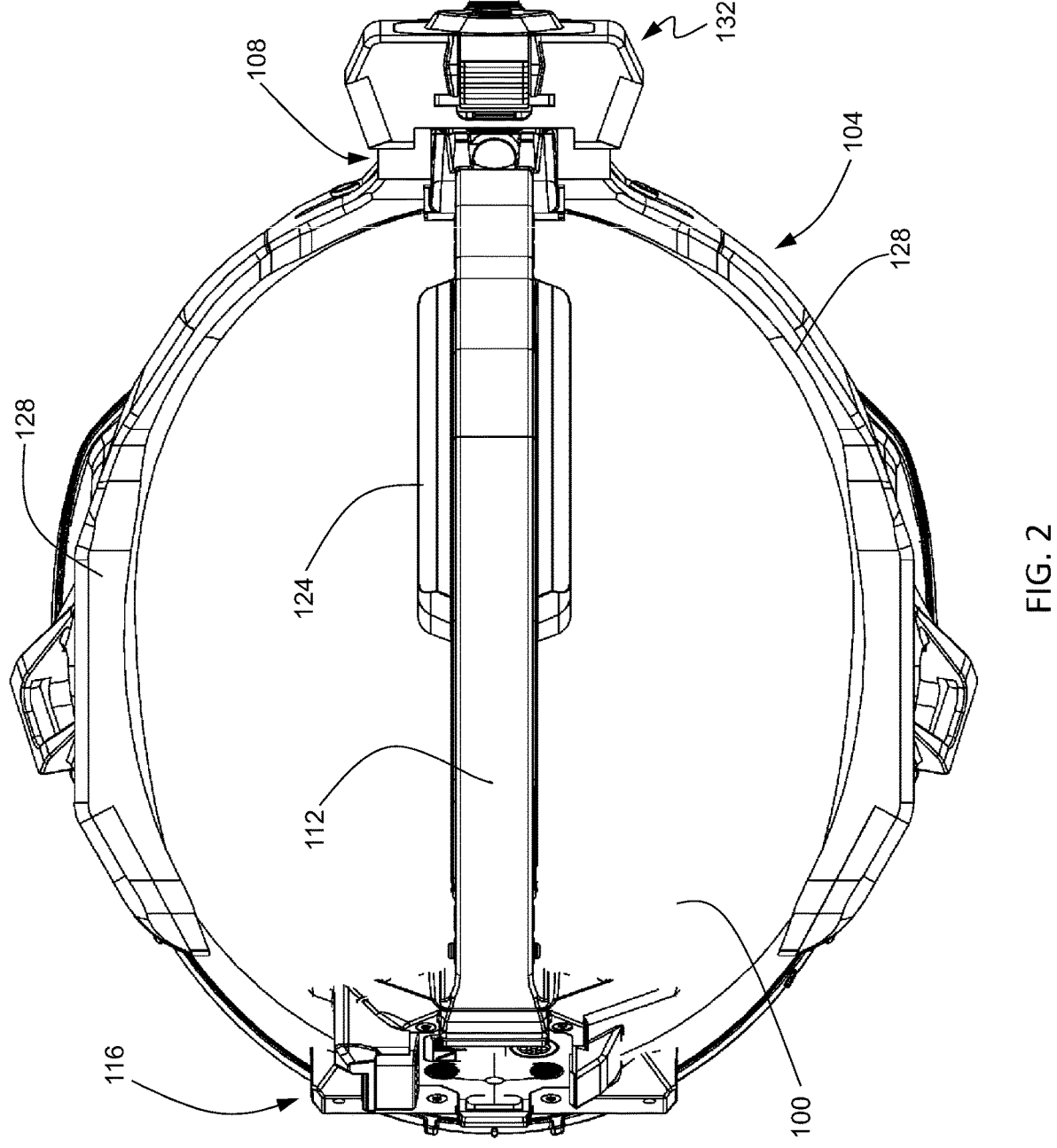
FIG. 2 is a top plan view of the helmet with the powered helmet mounting assembly and battery pack center base module appearing in FIG. 1.

Referring now to FIGS. 1 and 2, there is shown a helmet 100 having a helmet mount assembly designated generally as reference numeral 104. In embodiments, the helmet mount assembly may be as shown and described in commonly owned U.S. provisional patent application Ser. No. 63/427,496 filed Nov. 23, 2022, the entire contents of which are incorporated herein by reference in its entirety. In the illustrated embodiment, the helmet 100 is an Integrated Head Protection System (IHPS) helmet, it will be recognized that the present development can be adapted for use with all manner of protective helmets, including a Modular Integrated Communications Helmet (MICH), Advanced Combat Helmet (ACH), Enhanced Combat Helmet (ECH), and so forth.

In the illustrated embodiment, the helmet mount assembly 104 includes a rear battery mounting bracket 108 disposed at the rear of the helmet 100. A strap or cable cover 112 extends along a centerline of the helmet 100 from the rear battery mounting bracket 108 to a front shroud 116 disposed at the front of the helmet 100. The battery mounting bracket 108 includes a hot shoe style interface 120 (see FIG. 5). The front shroud 116, strap or cable cover 112, and rear mounting bracket 108 may be as described in commonly-owned U.S. Pat. No. 10,886,646 or commonly-owned U.S. Pat. No. 11,360,309, each of which is incorporated herein by reference in its entirety. An identification friend or for (IFF) module 124 is retained on the helmet 100 via the strap/cable cover 112. Left and right shrouds 128 are attached to the respective left and right sides of the helmet 100 via a threaded fastener 134 engaging a clearance opening 136 in the shrouds 132 and extend between the rear battery mounting bracket 108 and the front shroud 116. A battery pack center base module 132 is releasably attached to the rear battery mounting bracket 108.

Figure 4:
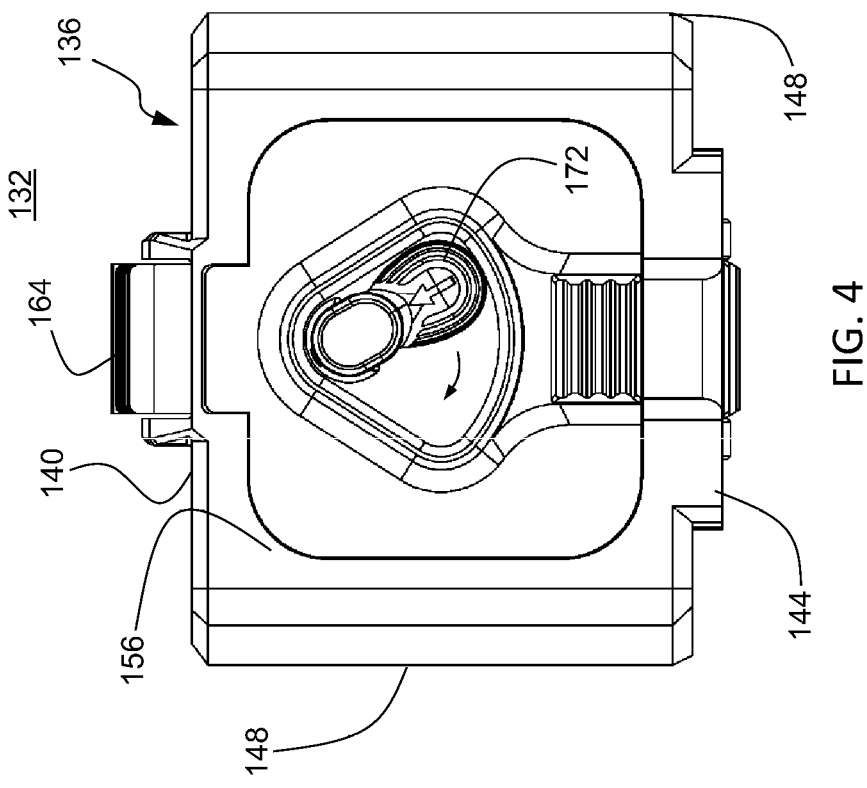
FIG. 4 is an enlarged, rear elevational view of the battery pack center base module appearing in FIG. 3.
Figure 3:
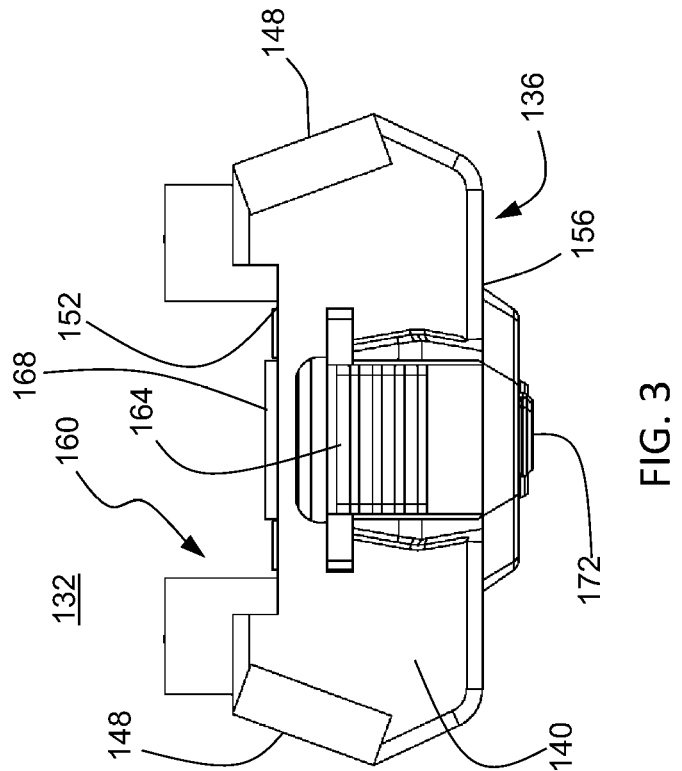
FIG. 3 is an enlarged, top plan view of the battery pack center base module appearing in FIG. 1.
Figure 5:
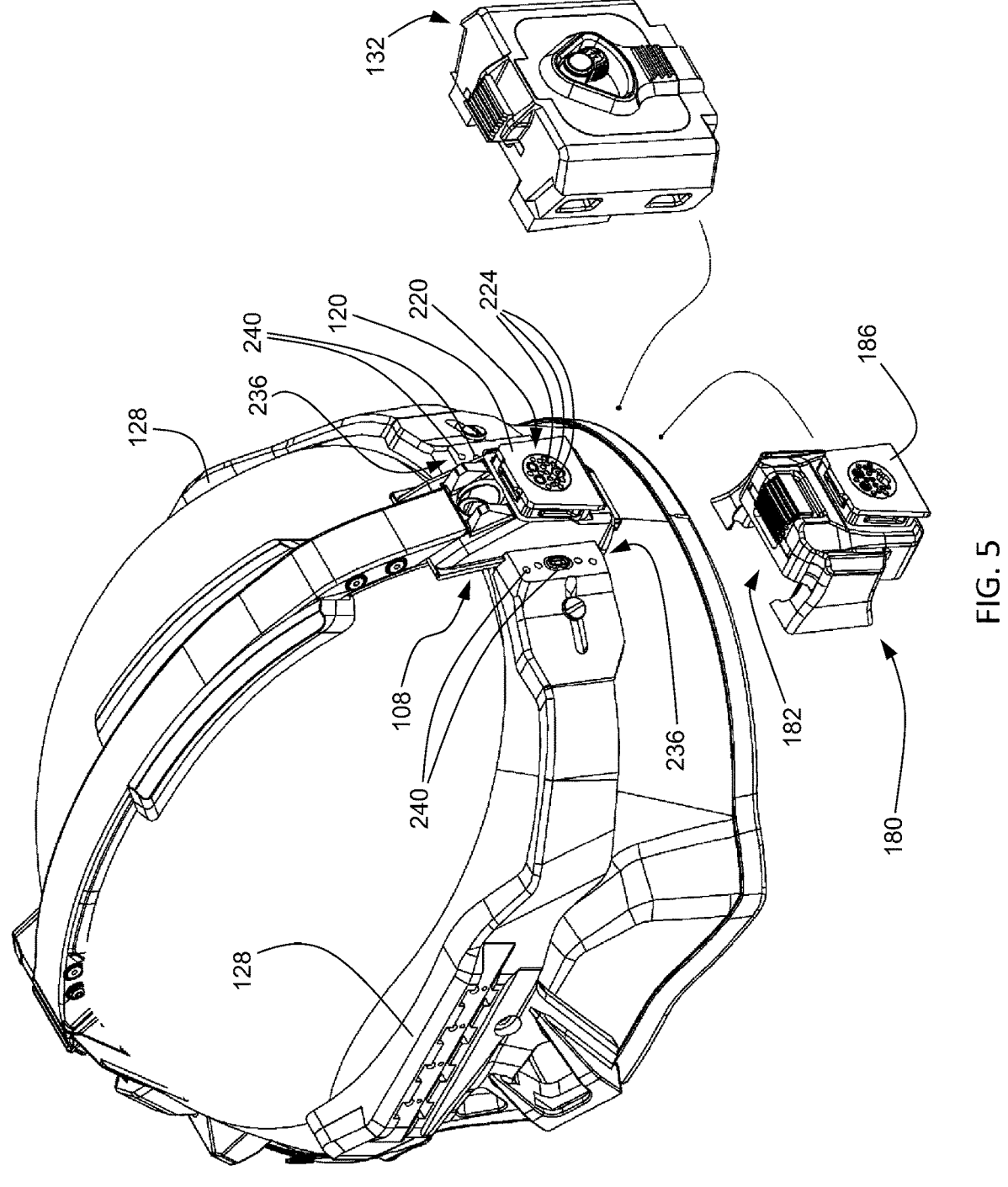
FIG. 5 is an isometric view, taken generally from the rear and left side, of the exemplary embodiment powered helmet mounting assembly, helmet, and battery pack center base module appearing in FIG. 1, showing the battery pack center base module shown detached from the rear mount assembly of the powered helmet mounting assembly and further showing the manner in which the battery pack center base module can be replaced with a battery pack adapter to allow other battery packs, such as legacy battery packs, to be operably coupled to the helmet mounting system.

Referring now to FIGS. 3 and 4, and with continued reference to FIGS. 1 and 2, the battery pack center base module 132 includes a main body 136 having a top surface 140, bottom surface 144, left and right side surfaces 148, a front or forward facing surface 152, and a rear or rearward facing surface 156. The front facing surface 152 includes a hot shoe receptacle 160 for detachably receiving the hot shoe mounting interface 120 on the rear battery mounting bracket 108. As best seen in FIG. 5, in the illustrated embodiment, the hot shoe interface 120 includes a dovetail mounting member and the hot shoe receptacle 160 includes a complementary dovetail receptacle for sliding engagement. A latch release button 164 is disposed on the upper surface 140 for disengaging a latch member 168 to allow sliding removal of the battery pack center base module 132 from the rear battery mounting bracket 108.

A battery selector switch 172 is pivotable between a left position and a right position. When the selector switch 172 is in the right position, the battery pack center base module 132 electrically couples a battery pack 176 (see FIG. 6) attached to the right side of the battery pack center base module 132 to the helmet mount assembly 104 via the rear battery mounting bracket 108. When the selector switch 172 is moved the left position as indicated by the arrow appearing in FIG. 4, the battery pack center base module 132 electrically couples a battery pack 176 (see FIG. 6) attached to the right side of the battery pack center base module 132 to the helmet mount assembly 104 via the rear battery mounting bracket 108. In operation, the user may use one of the battery packs 176 until it is depleted or nearly depleted and then use the selector switch 172 to switch the electrical connection to the other one of the battery packs 176.

In embodiments, the selector 172 allows switching between the left and right battery packs without interruption to the power being supplied to the helmet mount assembly 104. This is particularly advantageous when an accessory device attached to the helmet mount assembly 104 is a night vision device or other device which requires rebooting, which can sometimes take several minutes to complete, when the power is cycled. Each battery pack 176 is individually swappable such that when one battery pack 176 is depleted it can be changed without affecting operation of the devices being powered. In operation, when one of the battery packs 176 is depleted, the user then moves the selector switch to the battery pack 176 that is fully charged. The depleted battery pack 176 can then be pulled away from the center base module 132, overcoming the force of attraction between the magnetic fastener elements on the center base module and the battery pack, thereby allowing the user to easily change the batteries in front of the body in plain view of the user; whereas, otherwise this task is difficult to do blindly reaching around the back.

Referring now to FIG. 5 and with continued reference to FIGS. 1-4, there is shown a helmet 100 with helmet mount assembly 104 with the rear battery mounting bracket 108 configured to receive the battery pack center base module 132, wherein the helmet mounting system further includes a battery pack adapter 180 configured to interchangeably attach to the rear battery mounting bracket 108 in place of the battery pack center base module 132. The adapter 180 includes a receptacle 182 receiving the hot shoe 120 and a hot shoe 186 configured to attach an existing or legacy battery pack (not shown). The dedicated battery pack center base module 132 is advantageous in that it does not require an adapter and connects directly to the helmet mount assembly 104 and thereby reduces the profile of the attached battery pack in relation to the surface of the helmet. However, the battery pack adapter 180 increases the functionality of the helmet mount assembly 104 in that allows for the use of other types of battery packs, such as preexisting or legacy battery packs, such as Elbit battery packs (e.g., ENVG-B battery box), Harris L3 battery packs, and the like.

Figure 6:
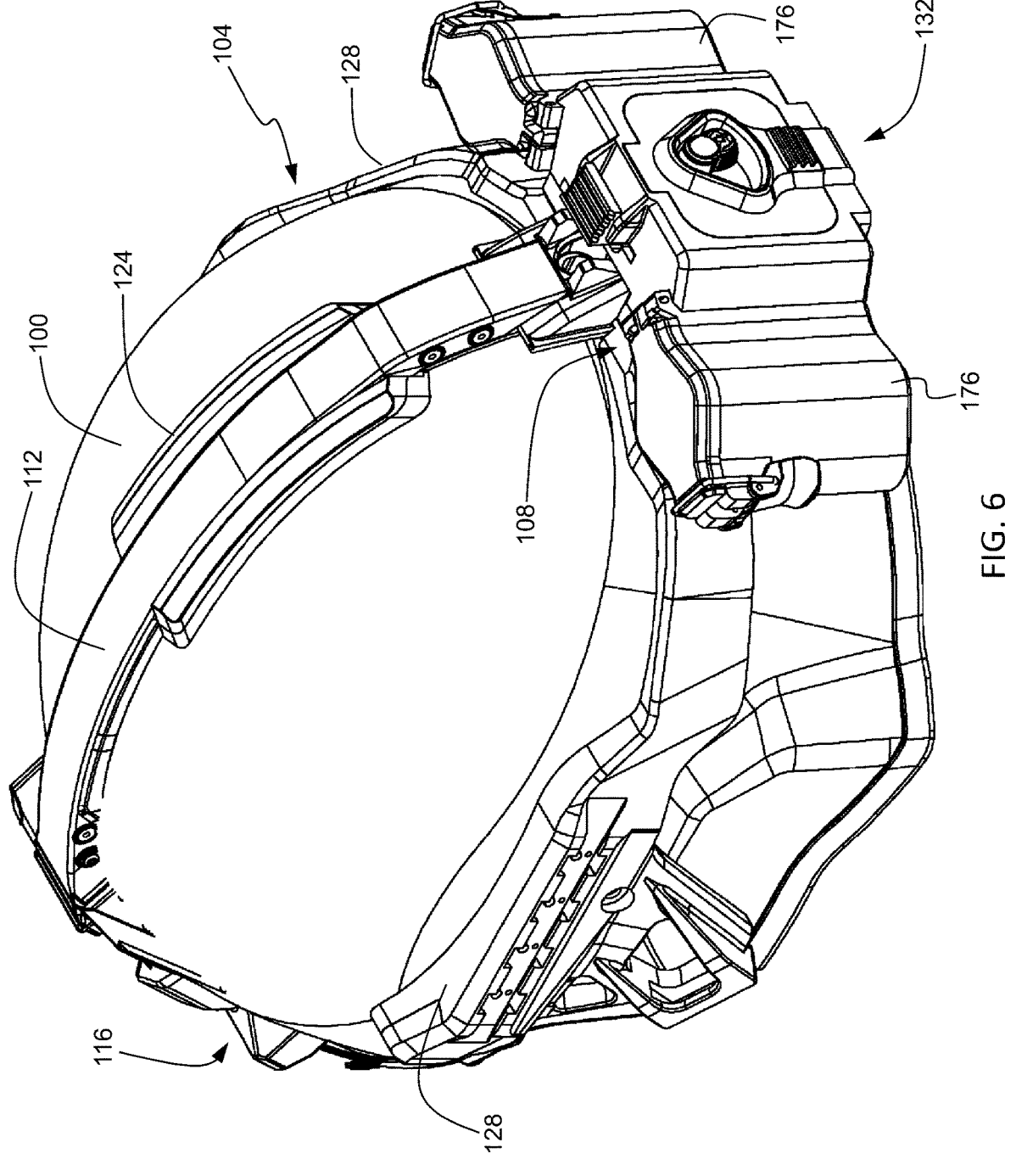
FIG. 6 is an isometric view of the powered helmet mounting assembly, helmet, and battery pack center base module appearing in FIG. 1, wherein left and right battery packs as removably attached to the battery pack center base module.
Figure 7:
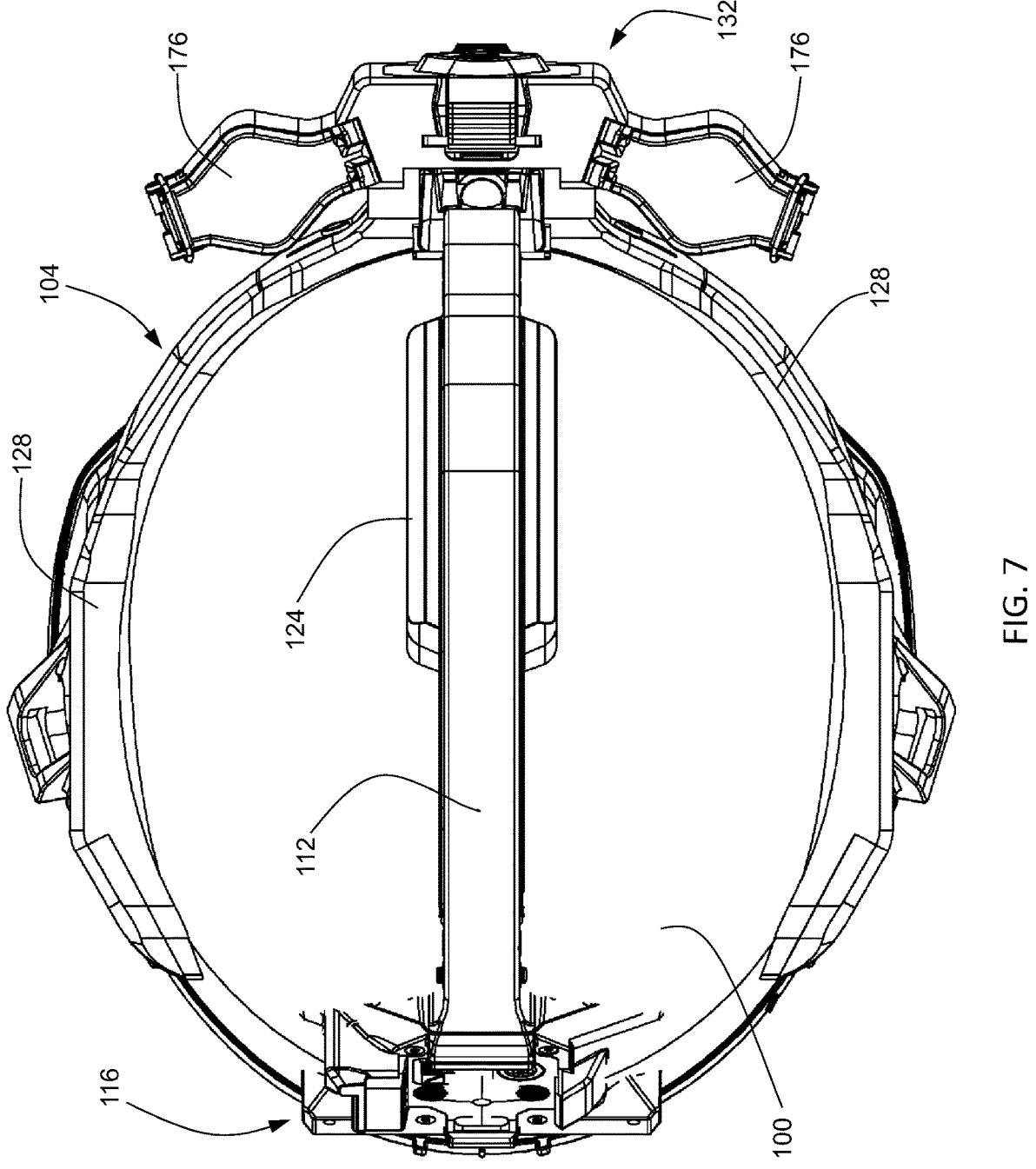
FIG. 7 is a top plan view of the powered helmet mounting assembly, helmet, battery pack center base module, and left and right battery packs appearing in FIG. 6.

Referring now to FIGS. 6 and 7 and with continued reference to FIGS. 1-5, there is shown a helmet 100 with helmet mount assembly 104 with the rear battery mounting bracket 108 receiving the battery pack center base module 132, as shown in FIGS. 1 and 2, respectively, wherein the battery pack center base module 132 has a battery pack 176 attached to each of the left and right side surfaces 148 thereof.

Figure 8:
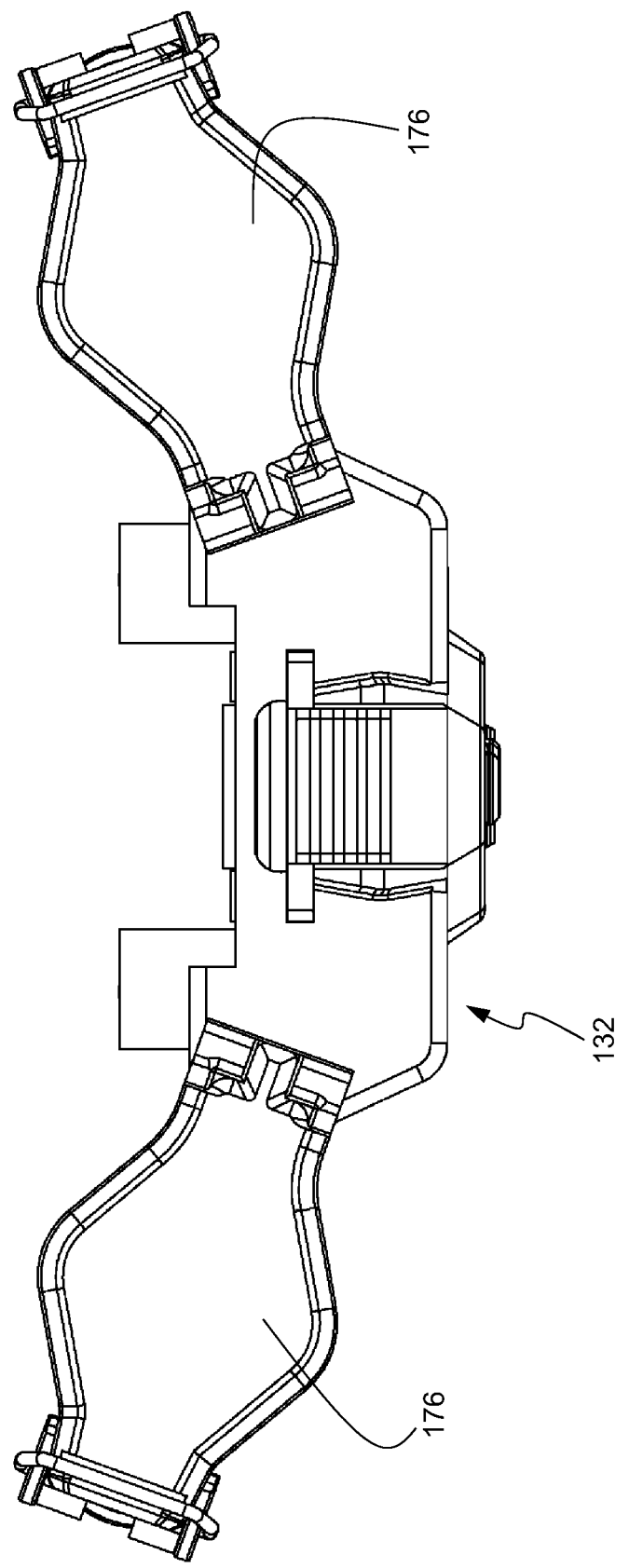
FIG. 8 is a top plan view of the battery pack center base module with left and right battery packs appearing in FIG. 6.
Figure 9:
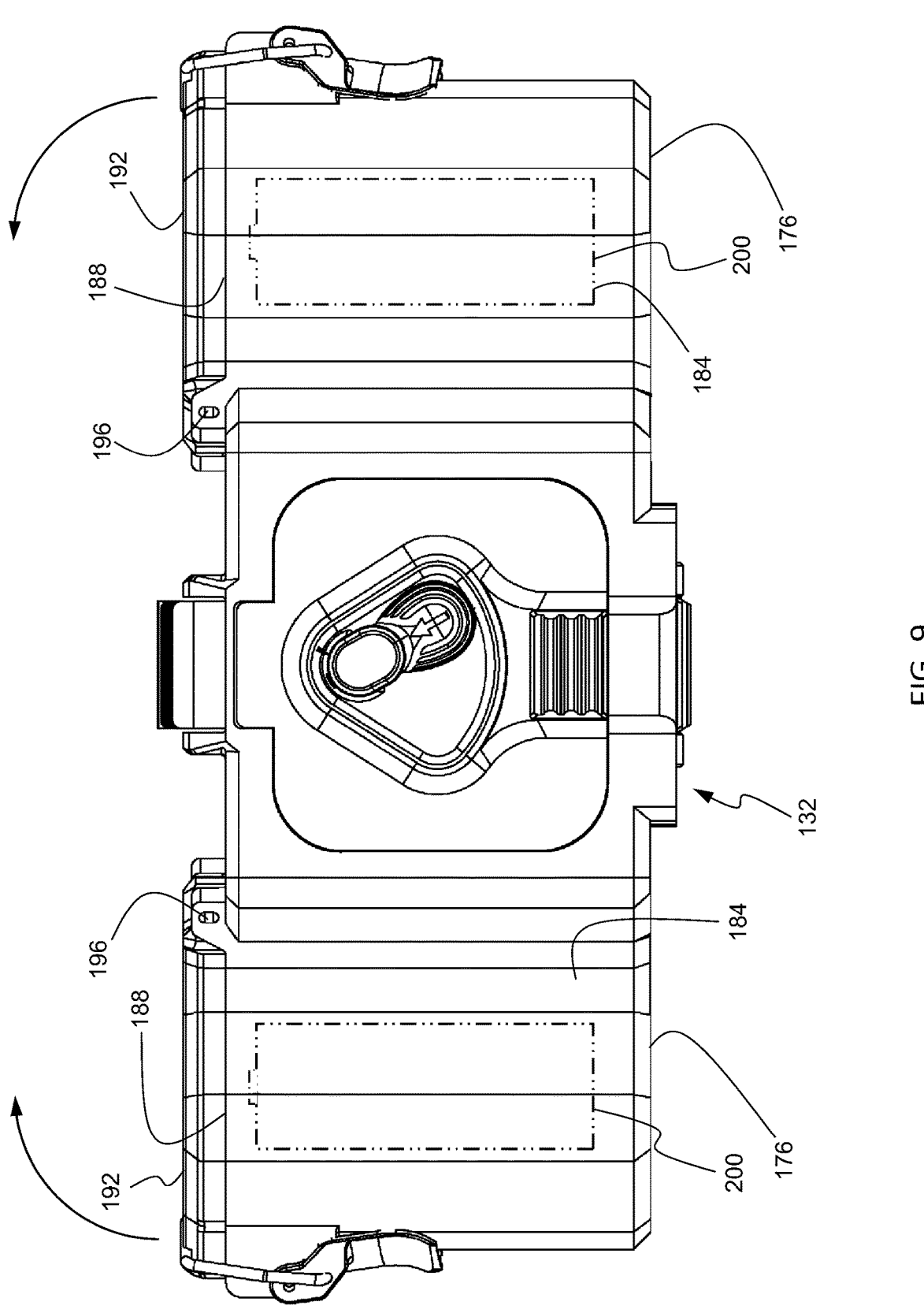
FIG. 9 is a rear elevational view of the battery pack center base module with left and right battery packs appearing in FIG. 6.
Figure 10:
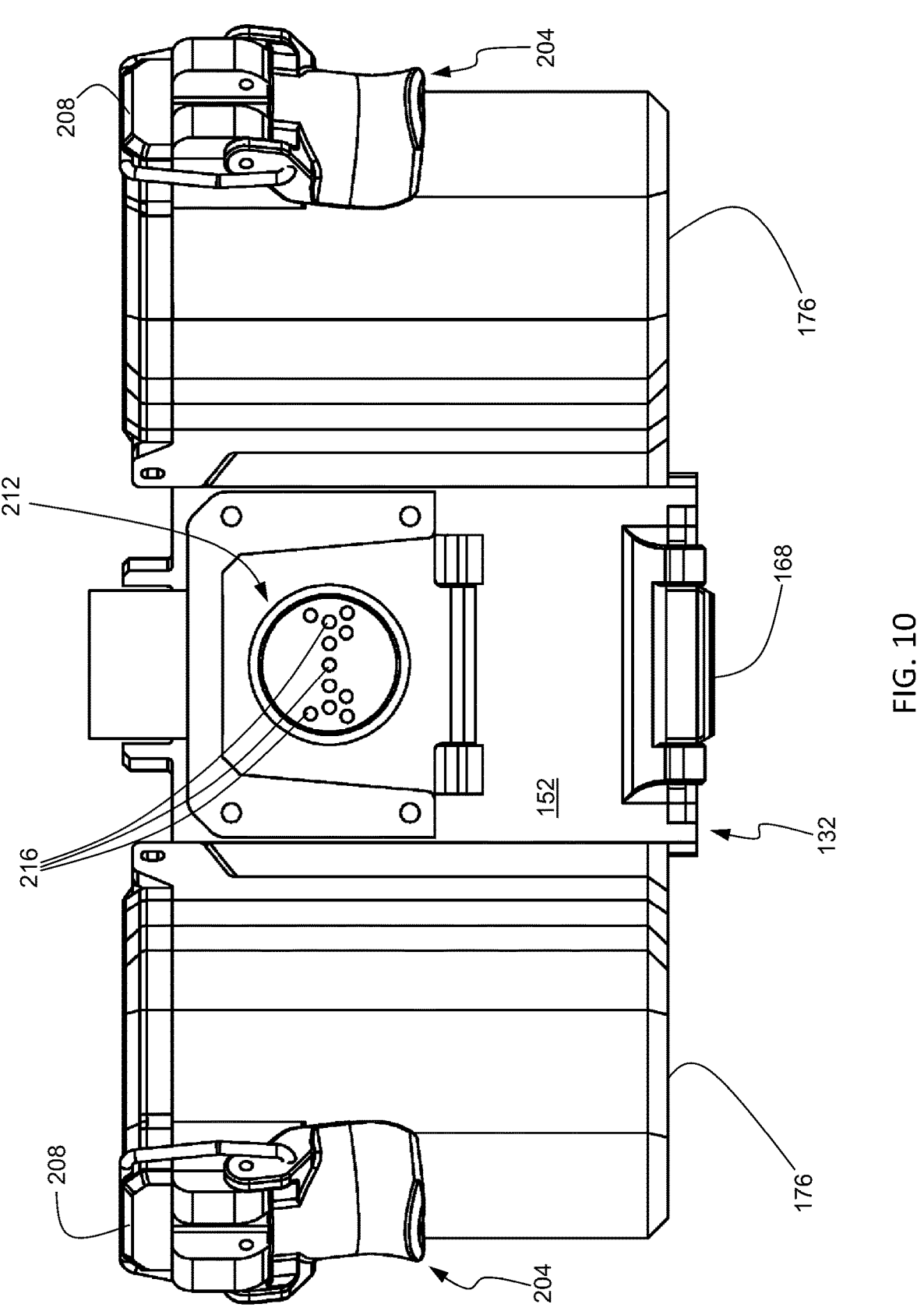
FIG. 10 is a front elevational view of the battery pack center base module with left and right battery packs appearing in FIG. 6.

Referring now to FIGS. 8-10 and with continued reference to FIGS. 1-7, there is shown top, rear, and front views, respectively, of the battery pack center base module 132, as shown in FIGS. 3 and 4, respectively, wherein the battery pack center base module 132 has a battery pack 176 attached to each of the left and right side surfaces 148 thereof.

In the illustrated exemplary embodiment, the battery pack 176 includes a housing 184 defining a battery compartment. The housing 184 has an open upper end 188 which is closed by a hinged cover 192. The hinged cover 192 is pivotally attached to the housing 184 via a hinge 196 disposed at the proximal end of the cover 192 to allow opening and closing of the battery pack for insertion and removal of battery(ies) 200 into and from the housing 184. In embodiments, housing 184 includes releasable coupling element 204, secured to the housing 184 adjacent the distal end of the battery pack cover 192, such as a latch (e.g., draw latch), clasp, buckle, or other releasable coupling as would be understood by persons skilled in the art. The coupling element 204 releasably engages a complementary attachment feature, such as a catch 208 disposed on the distal end of the cover 192.

The forward facing surface 152 of the battery pack center base module 132 includes an electrical connector element 212 comprising a plurality of electrical contacts 216. The connector element 212 is aligned with an opposing connector element 220 on the hot shoe interface 120 on the rear battery mounting bracket 108, the connector element 220 comprising a plurality of electrical contacts 224 which are aligned with and face the electrical contacts 216 to provide communication of power, data, and control signals between the battery pack center base module 132 and the helmet mount assembly 104.

The forward facing surface 152 of the battery pack center base module 132 further includes an electrical connector element 212 comprising a plurality of electrical contacts 216. The connector element 212 is aligned with an opposing connector element 220 on the hot shoe interface 120 on the rear battery mounting bracket 108, the connector element 220 comprising a plurality of electrical contacts 224 which are aligned with and face the electrical contacts 216.

Figure 11:
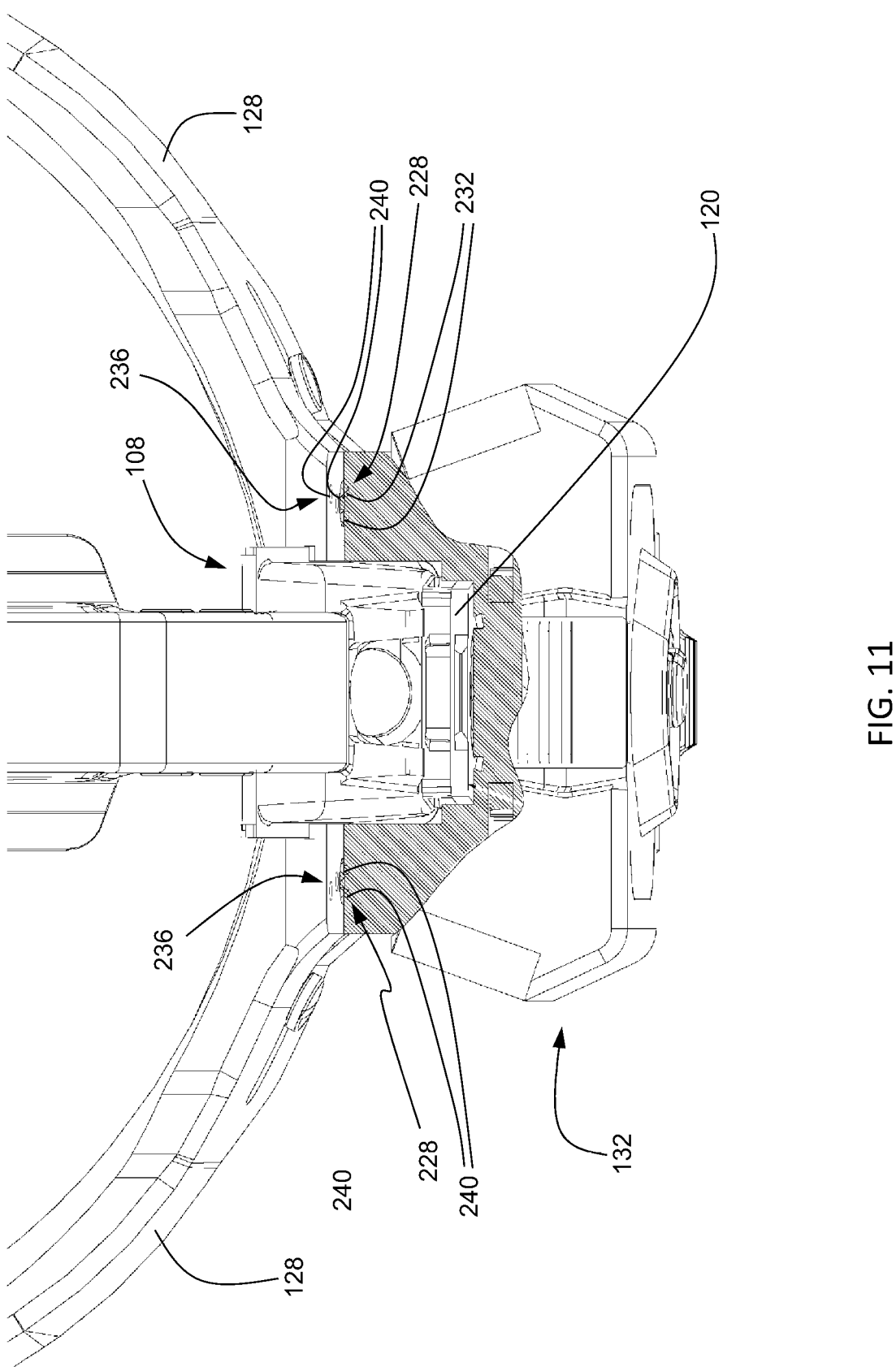
FIG. 11 is a fragmentary top view of the helmet with powered helmet mounting assembly, with the battery pack center base module of FIG. 1 attached to the rear mount assembly on the powered helmet mounting assembly.

Referring now to FIG. 11, and with continued reference to FIGS. 1-10, there is shown a top view illustrating the battery pack center base module 132 attached to the rear battery mounting bracket 108, wherein a portion of the battery pack center base module 132 is cutaway to show the hot shoe 120 within the hot shoe receptacle 160. The forward facing surface 152 of the battery pack center base module 132 further includes a left and right electrical connector elements 228 comprising a plurality of electrical contacts 232. The connector elements 228 are aligned with opposing left and right connector elements 236 on the left and right helmet brackets 128, respectively. The connector element 236 comprises a plurality of electrical contacts 224 which are aligned with and face the electrical contacts 232.

Figure 12:
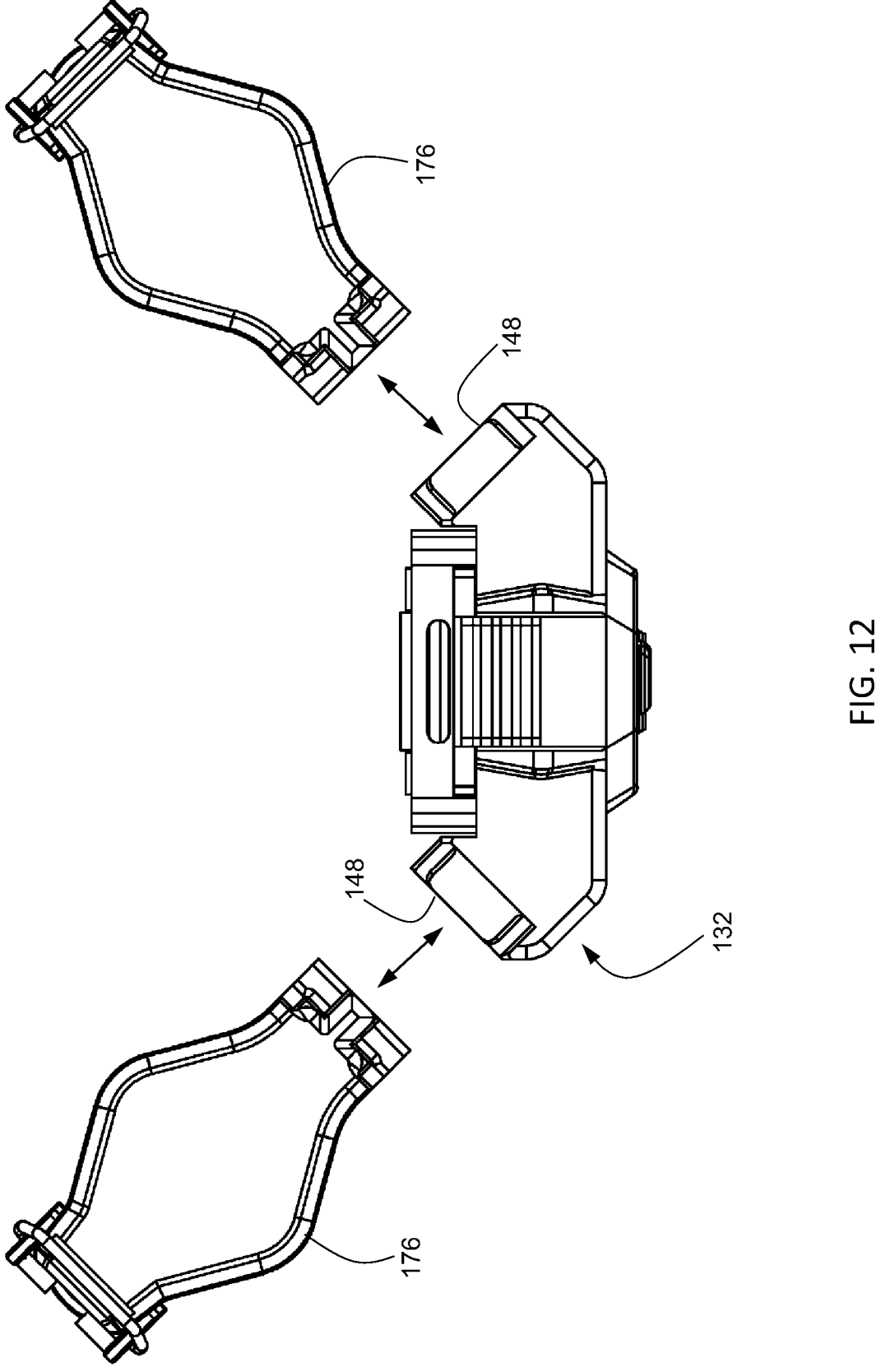
FIG. 12 is an exploded top plan view of the battery pack center base module with left and right battery packs appearing in FIG. 8.
Figure 13:
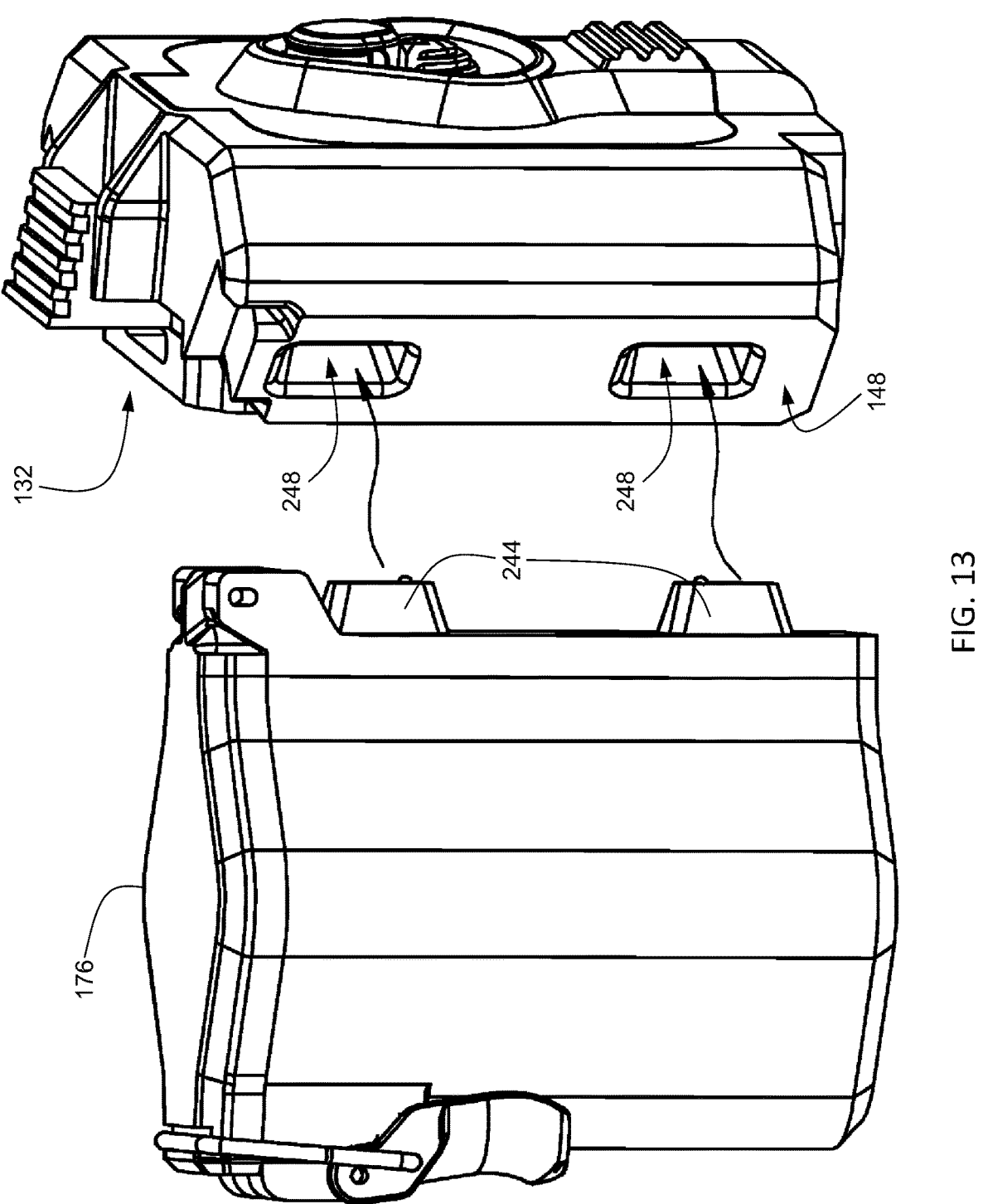
FIG. 13 is an enlarged isometric view of showing the manner of attachment of a battery pack to battery pack center base module.
Figure 14:
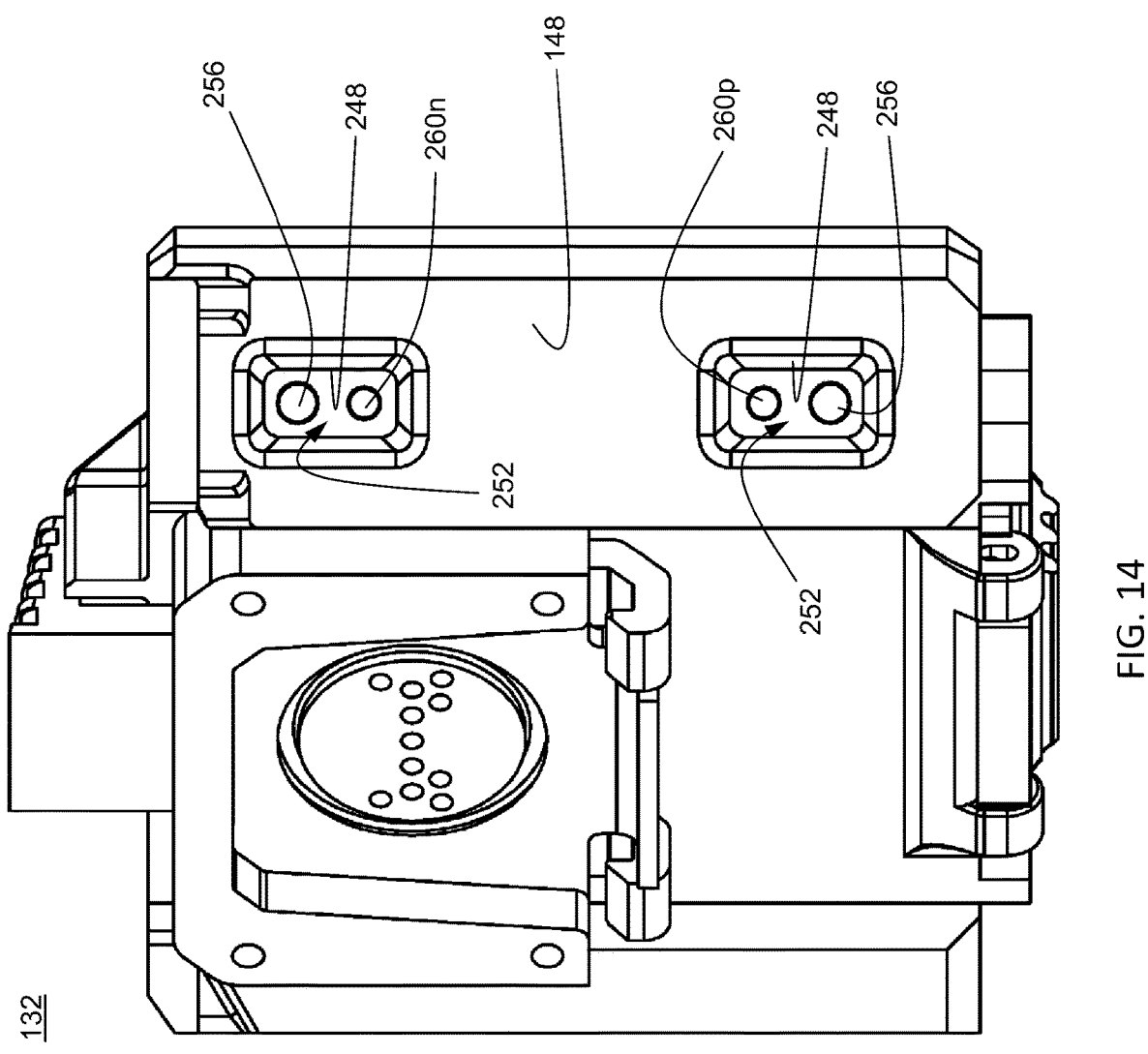
FIG. 14 is an enlarged elevational view of the battery pack center base module showing the left side battery pack connector interface.
Figure 15:
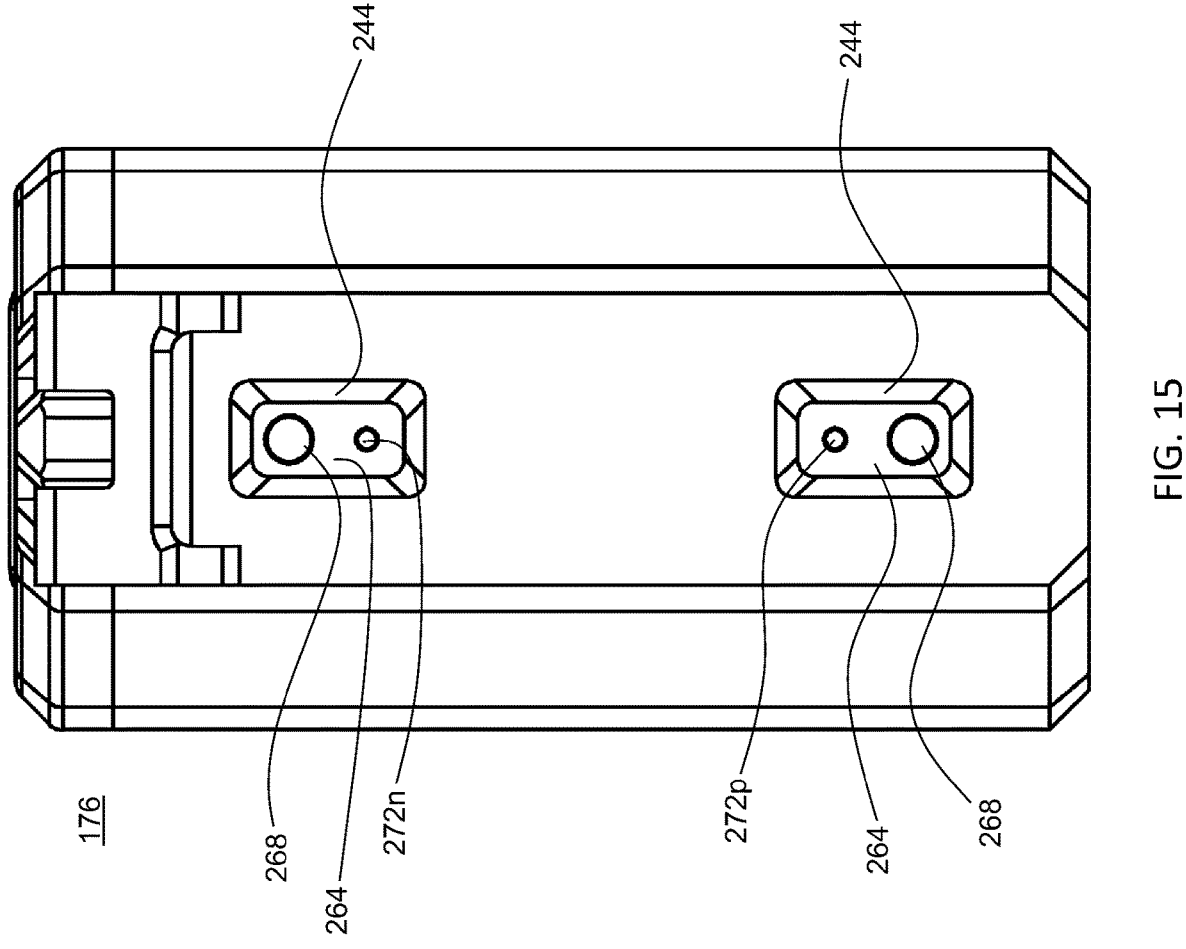
FIG. 15 is an enlarged end elevational view of a battery pack, taken from the connection interface end.
Figure 16:
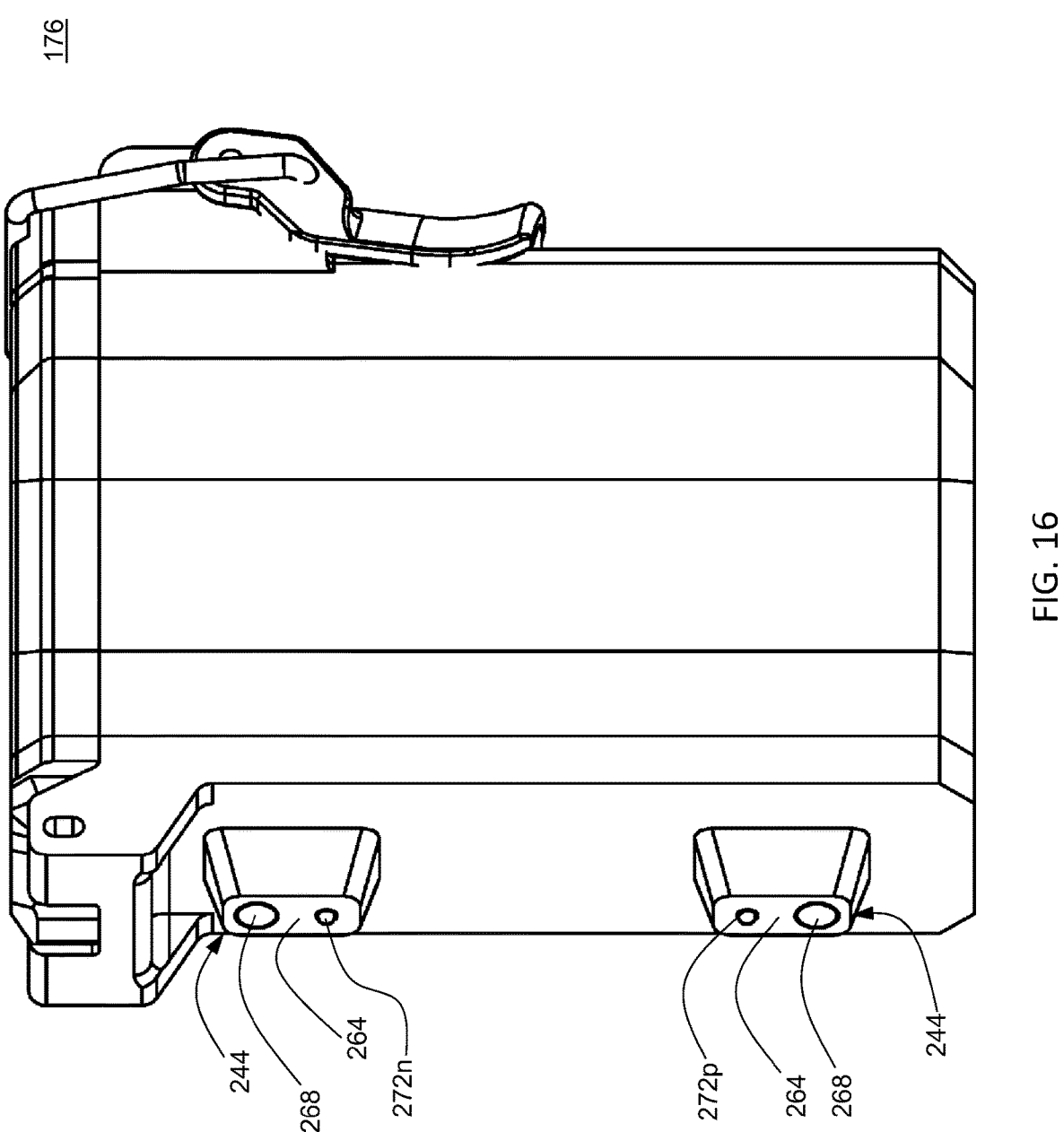
FIG. 16 an enlarged elevational view of the battery pack appearing in FIG. 15, taken generally from the side.
Figure 17:
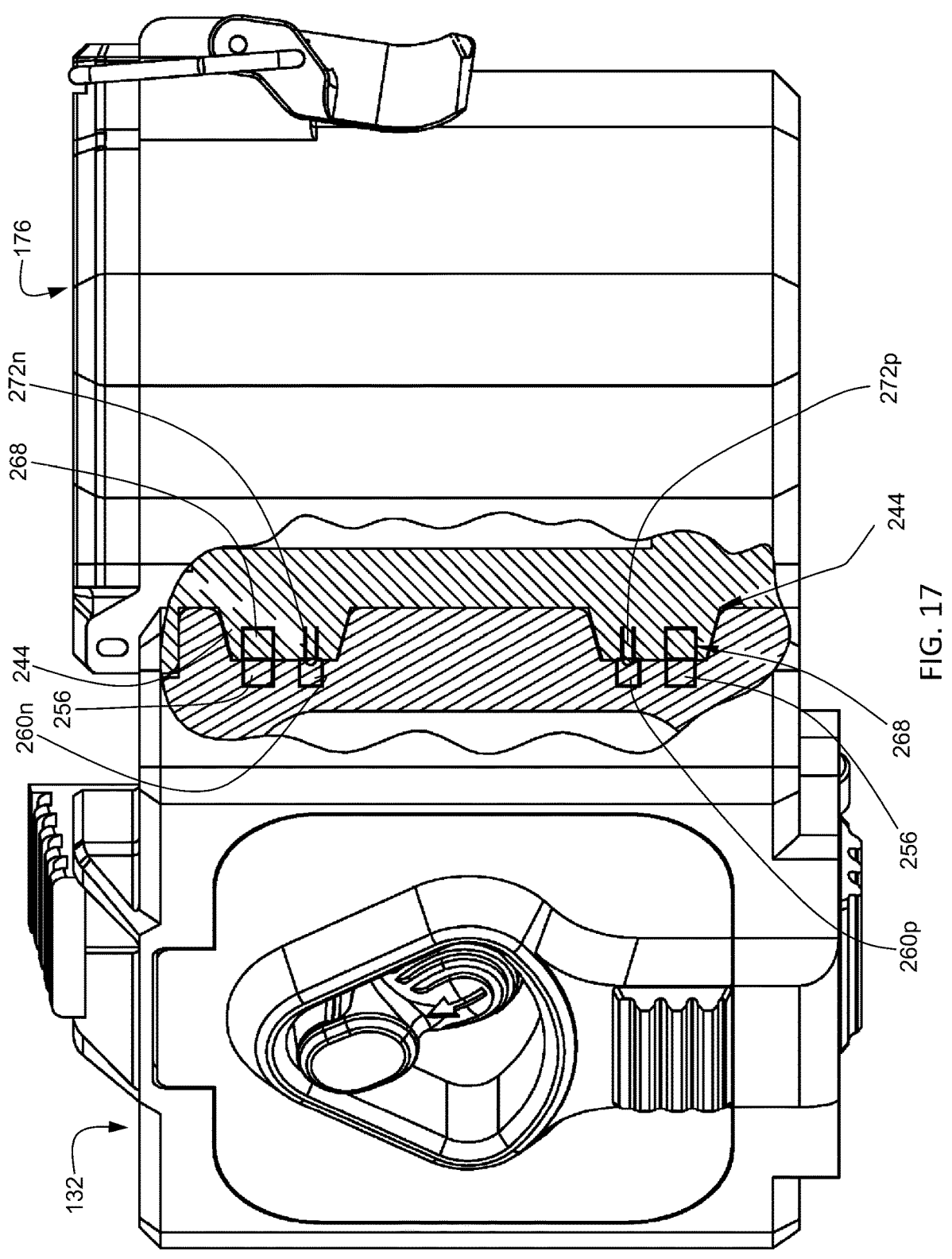
FIG. 17 an elevational view of a battery pack attached to the right side of the battery pack center base module, with a cutaway region showing the electrical and physical connections.

Referring now to FIG. 12, and with continued reference to FIGS. 1-11, there is shown the battery pack center base module 132 with the left and right battery packs 176 spaced apart from the respective left and right side surfaces 148, illustrating the manner of attachment and removal of the battery packs 176 from the battery pack center base module 132.

Referring now to FIGS. 13-17, and with continued reference to FIGS. 1-12, there is illustrated the manner of attachment of the battery packs 176 to the battery pack center base module 132. The battery pack housing 184 includes a pair of frusto-pyramidical lugs 244 which releasably seat in correspondingly shaped receptacles or sockets 248 formed in the side surface 148 of the battery pack center base module 132. It will be recognized that the lugs 244 may have other geometrical configurations, such as frusto-conical, truncated triangular pyramid, and so forth. A base surface 252 of each receptacle 252 includes a magnetic fastener element 256 and an electrical contact 260p, 260n. An upper surface 264 of each lug 244 includes a magnetic fastener element 268 is aligned with the magnetic fastener element 256 and an electrical contact 272p, 272n which is aligned with a respective one of the electrical contacts 260p, 260n. In embodiments, the electrical contact 272n is electrically coupled to the negative terminal of the battery(ies)

200 in the battery pack 176 and the electrical contact 272*p* is electrically coupled to the positive terminal of the battery(ies) 200 in the battery pack 176.

In certain embodiments, the magnetic fastener elements 256 and 268 are each permanent magnets wherein the aligned faces are of opposite polarity to provide a physical connection between the battery pack center base module 132 and the battery pack 176 when the lugs 244 are inserted into the sockets 248. In alternative embodiments, for each of the magnetic fastener element pairs 256, 268, one is a permanent magnet and the other is formed of a magnetically attractable material such as a ferromagnetic metal to provide a physical connection between the battery pack center base module 132 and the battery pack 176. In operation, to remove the battery pack 176 from the battery pack center base module 132 to user exerts a pulling force on the battery pack 176 which is greater than the magnetic force of attraction between the fastener elements 256, 268.

Figure 18:
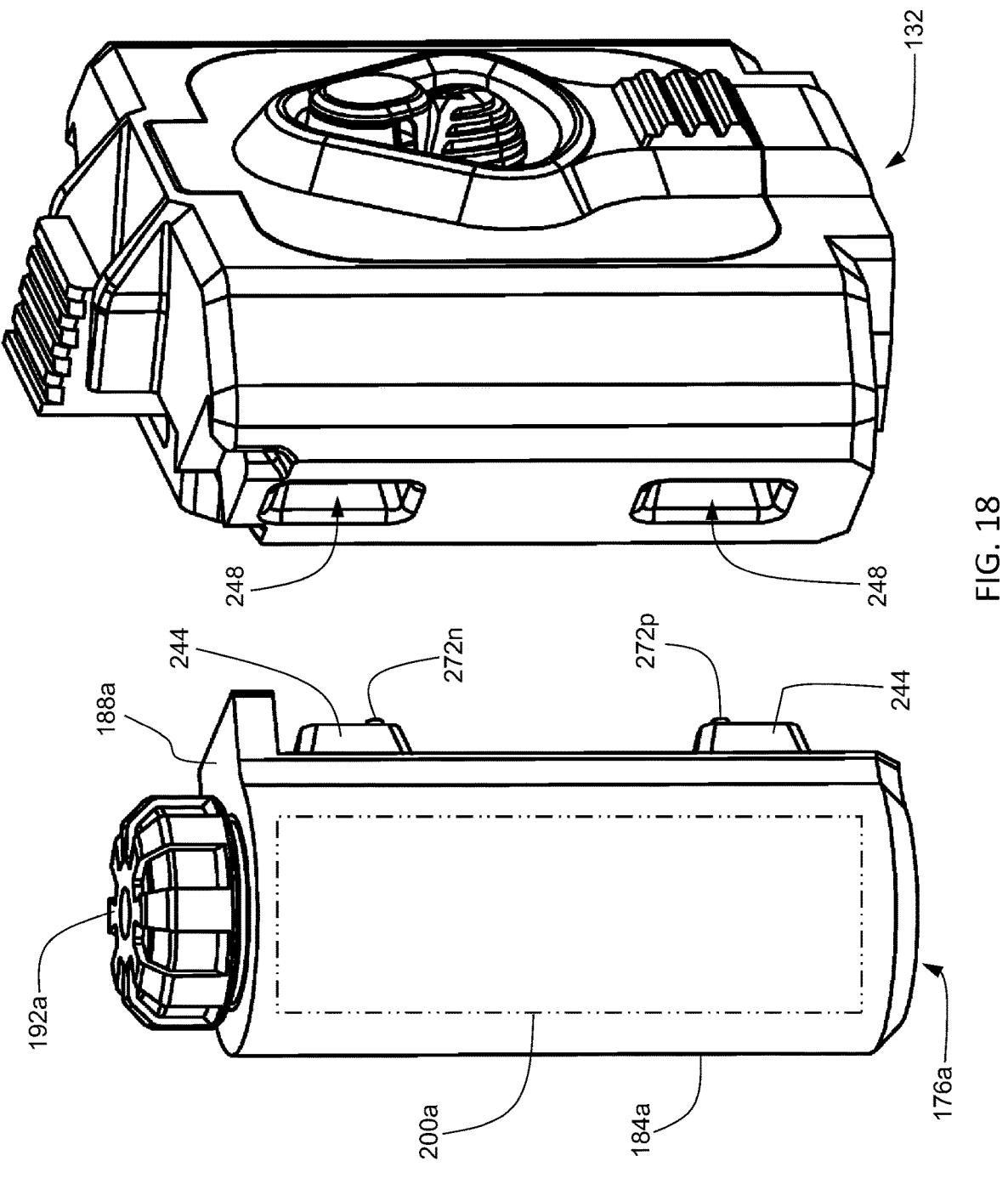
FIGS. 18 and 19 illustrate the battery pack center base module with an alternative battery pack and show the manner of attaching the battery pack to the battery pack center base module.

Referring now to FIG. 18, and with continued reference to FIGS. 1-17, there appears the battery pack center base module 132 and a first alternative embodiment battery pack 176*a*. In the illustrated exemplary embodiment, the battery pack 176*a* includes a housing 184*a* defining a battery compartment configured to receive a single AAA battery 200*a*. The housing 184*a* has an open upper end 188*a* which is closed by a removable threaded cap 192*a*.

Figure 19:
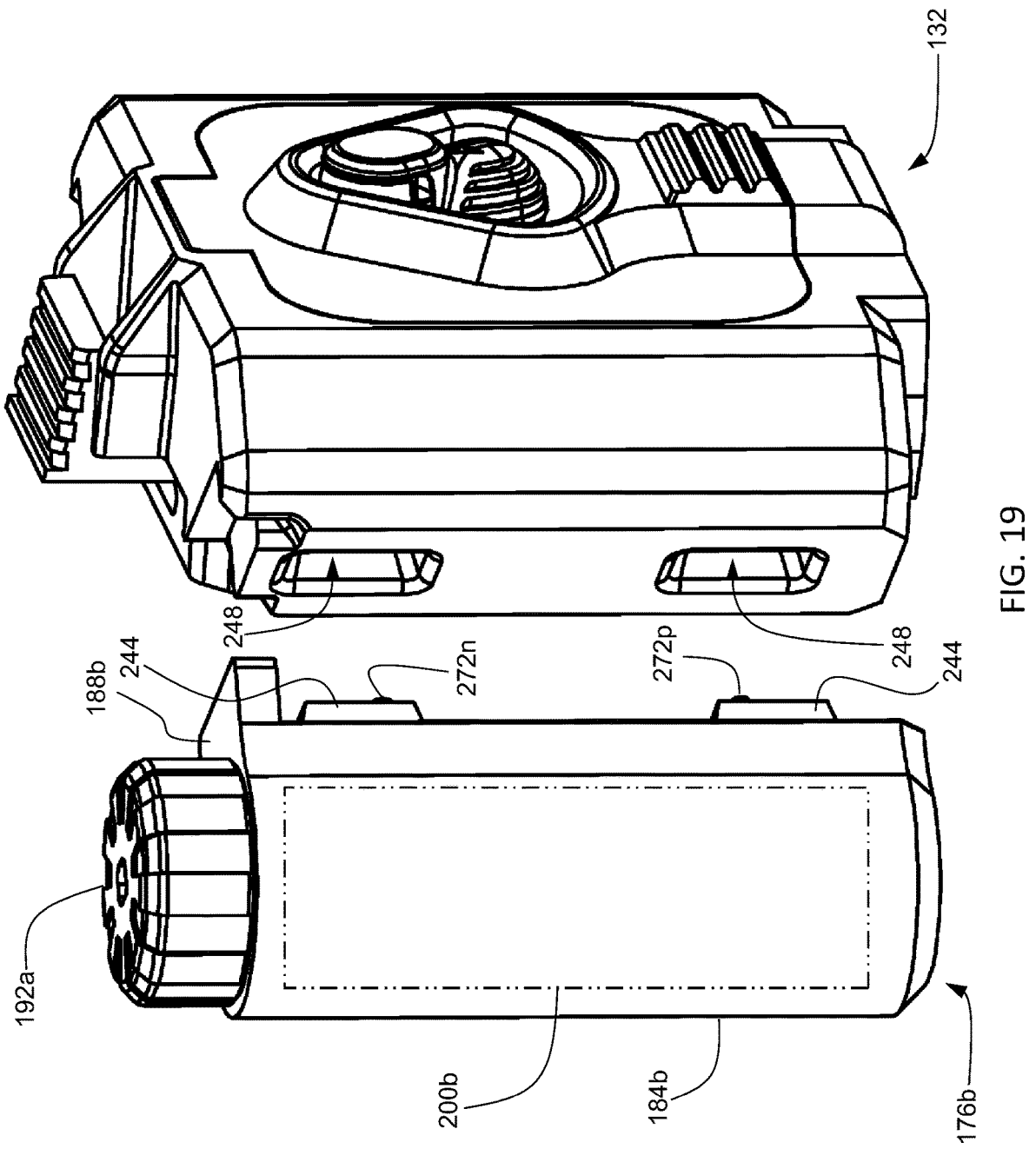

Referring now to FIG. 19, and with continued reference to FIGS. 1-18, there appears the battery pack center base module 132 and a second alternative embodiment battery pack 176*b*. In the illustrated exemplary embodiment, the battery pack 176*b* includes a housing 184*b* defining a battery compartment configured to receive a single CR123A battery 200*b*. The housing 184*b* has an open upper end 188*b* which is closed by a removable threaded cap 192*a*.

Figure 20:
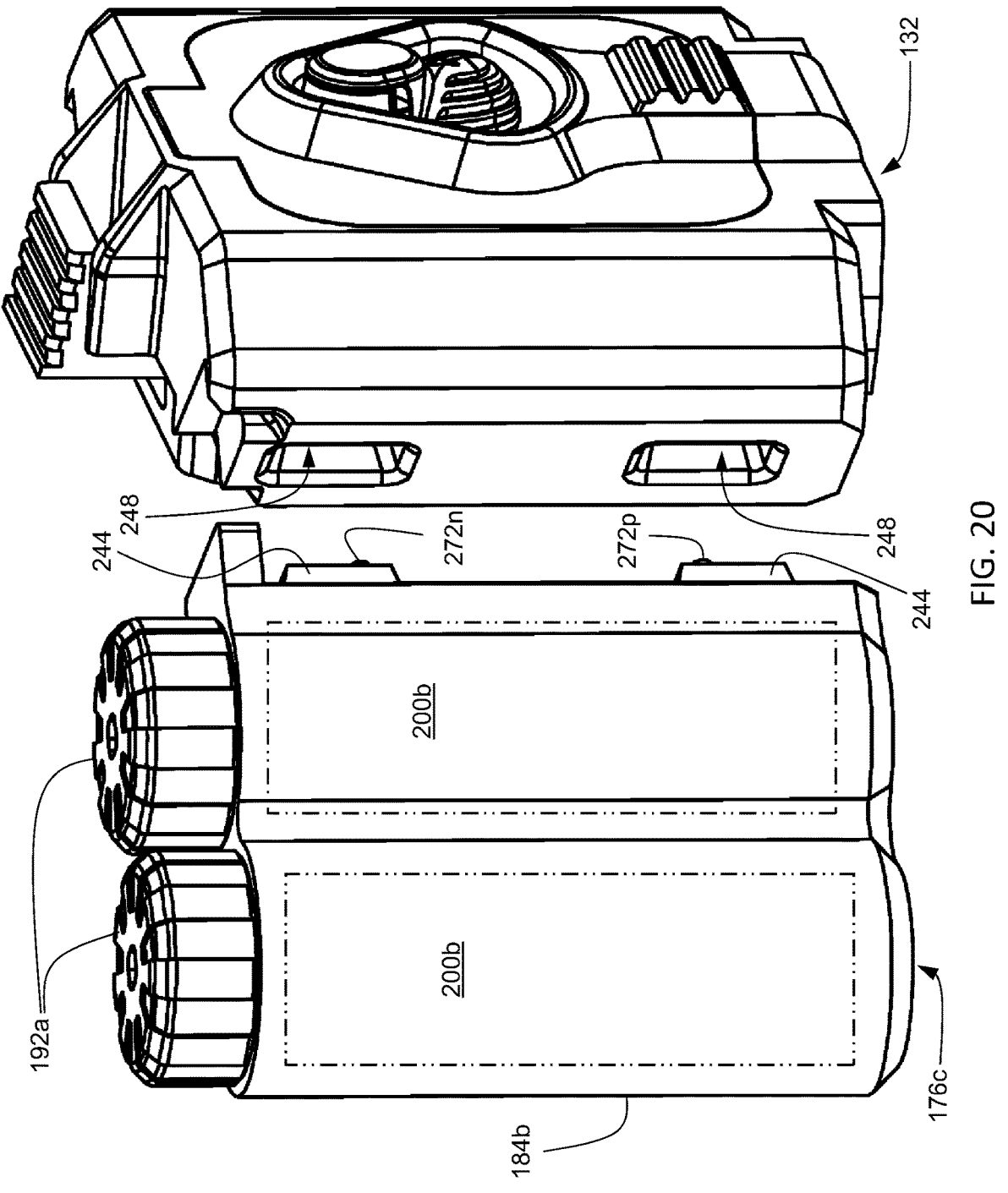
FIG. 20 illustrates the battery pack center base module with another alternative battery pack.

Referring now to FIG. 20, and with continued reference to FIGS. 1-19, there appears the battery pack center base module 132 and a third alternative embodiment battery pack 176*c*. In the illustrated exemplary embodiment, the battery pack 176*c* includes a housing 184*c* defining two battery compartments each configured to receive a CR123A battery 200*b*. The battery compartments have an open upper ends which are closed by removable threaded caps 192*a*.

Figure 21:
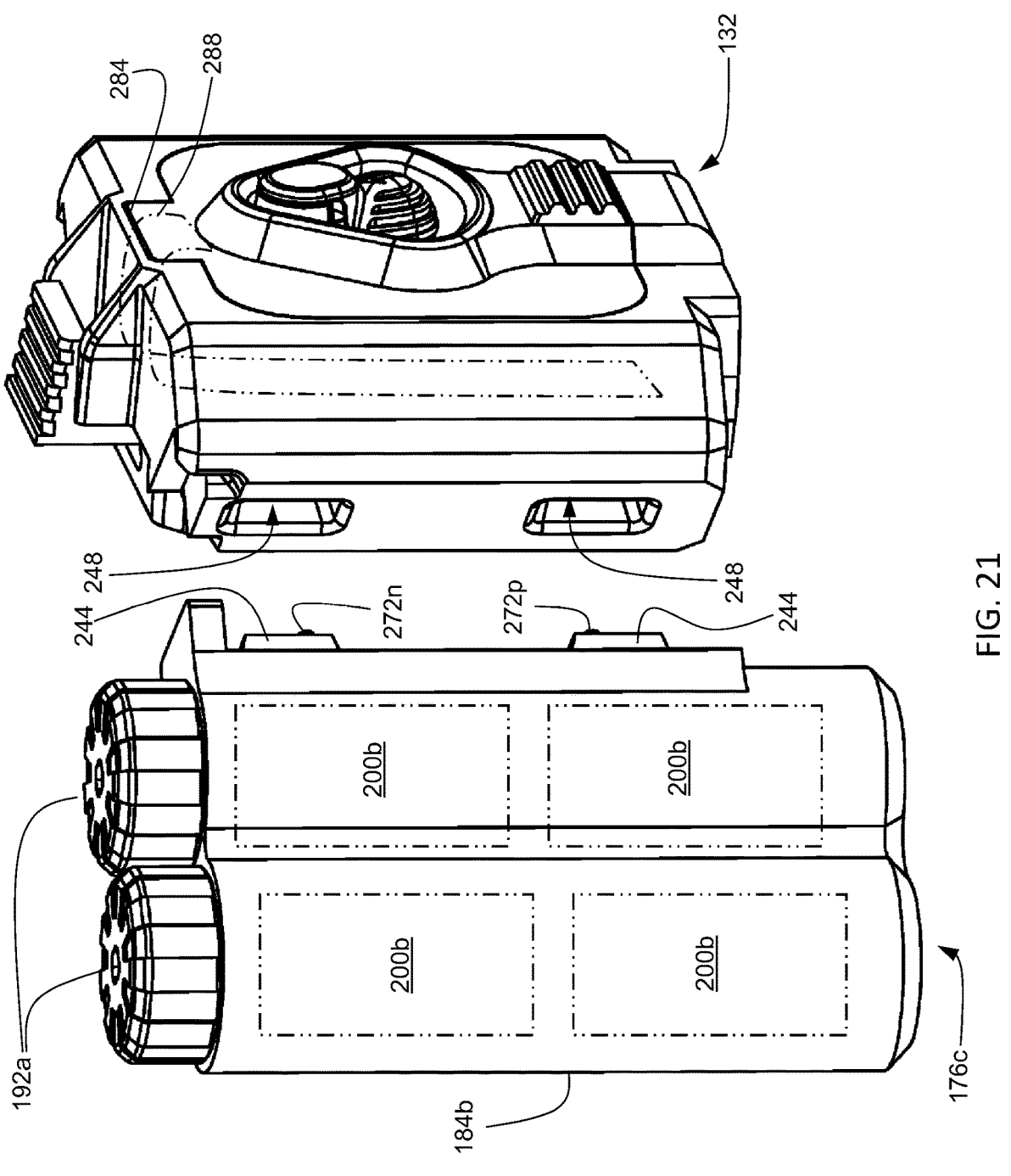
FIG. 21 illustrates the battery pack center base module with yet another alternative battery pack.
Figure 22:
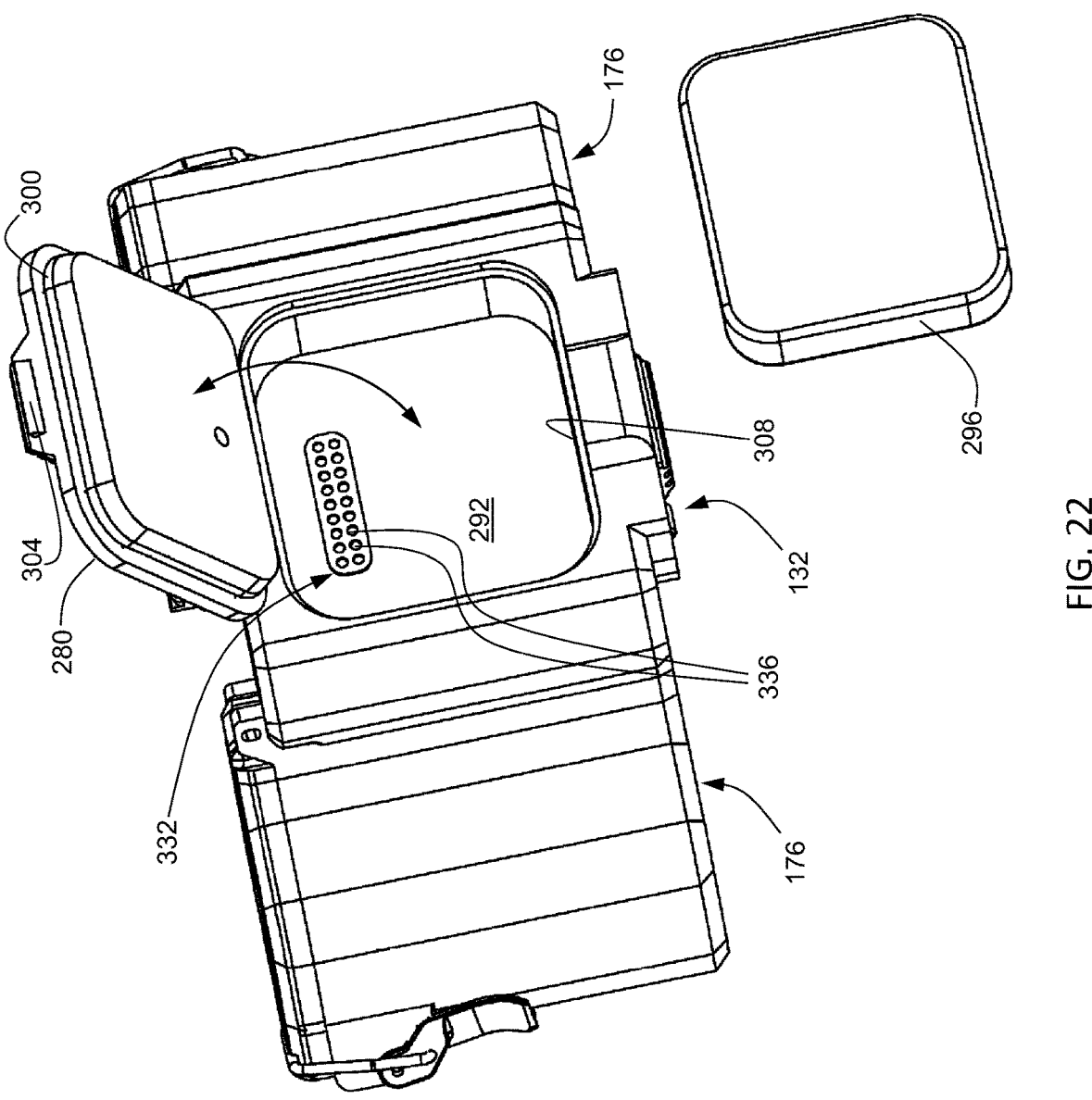
FIG. 22 is an isometric view of the battery pack center base module with left and right battery packs attached and showing the hinged rear panel in the open position for receiving a modular processing board cartridge.
Figures 23, 24:
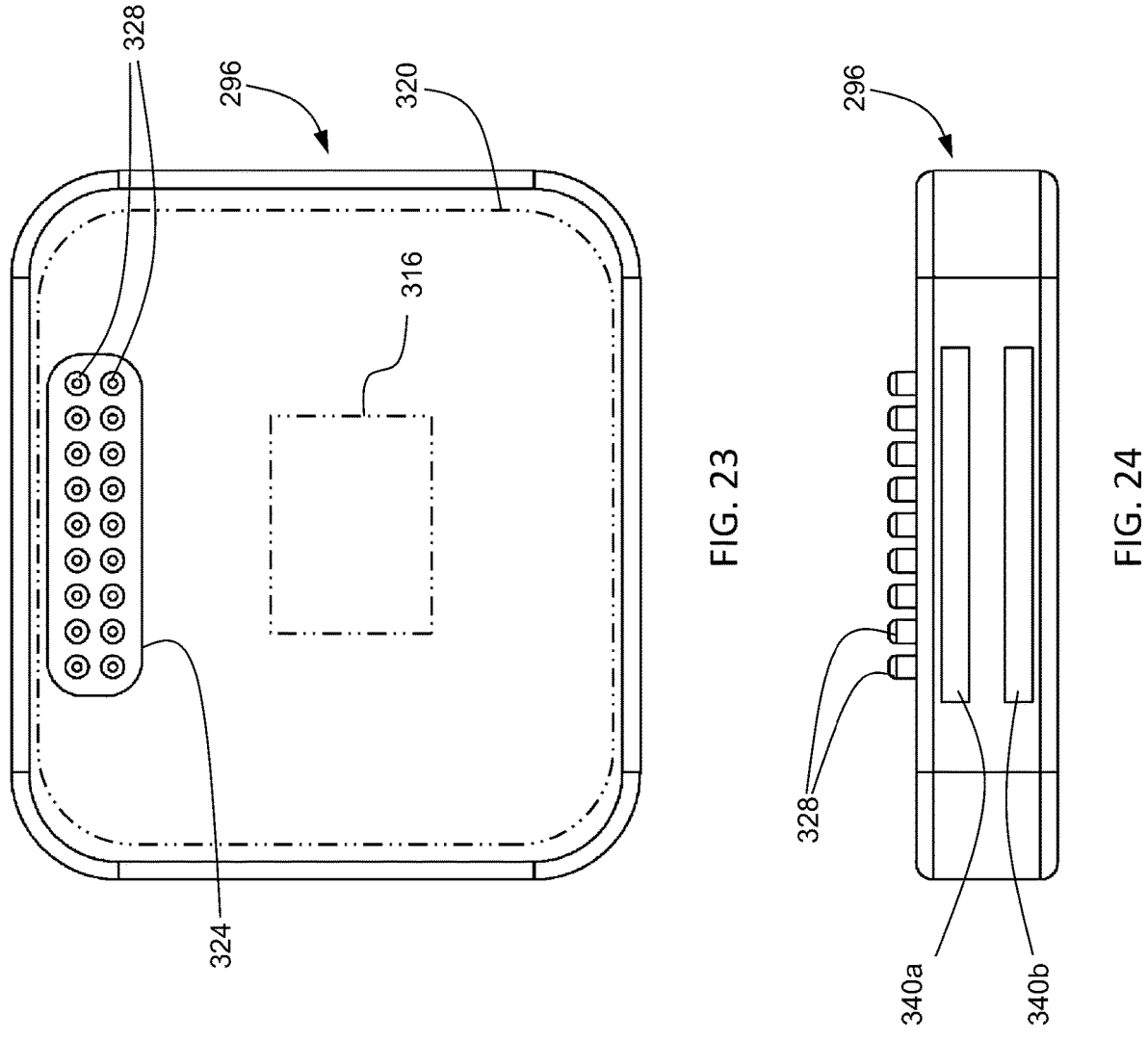
FIG. 23 is an enlarged rear elevational view of the modular processing board cartridge appearing in FIG. 22.
FIG. 24 is an enlarged bottom plan view of the modular processing board cartridge appearing in FIG. 23.
Figure 25:
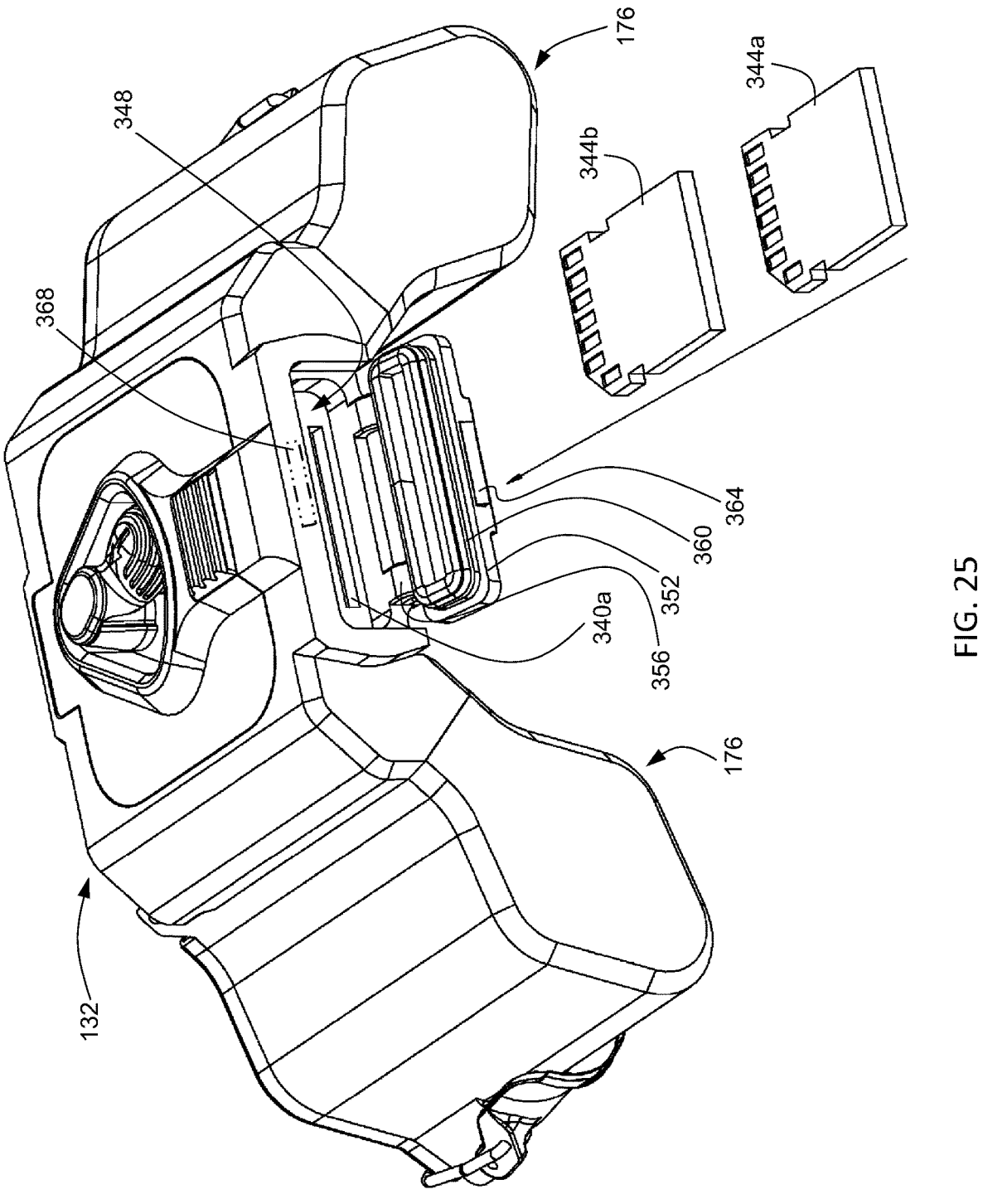
FIG. 25 is an isometric view of the battery pack center base module with left and right battery packs attached and showing the hinged bottom panel in the open position for receiving programmable electronic storage media, such as non-volatile flash memory cards.

Referring now to FIG. 21, and with continued reference to FIGS. 1-20, there appears the battery pack center base module 132 and a fourth alternative embodiment battery pack 176*d*. In the illustrated exemplary embodiment, the battery pack 176*d* includes a housing 184*d* defining two battery compartments each configured to receive two CR123A batteries 200*b*. The battery compartments have an open upper ends which are closed by removable threaded caps 192*a*.

Referring now to FIGS. 22-25, and with continued reference to FIGS. 1-21, the battery pack center base module 132 includes a hatch door 280 on the rear surface 156 of the main body 136 which covers a cavity 292 configured to receive a modular processing board cartridge 296. The door 280 is pivotable about a hinge 284. The battery pack selector switch 172 is electrically coupled to the electrical components within the main body 136 via a flex circuit 288 which passes through the hinge 284 and which comprises circuit conductors or traces formed on a flexible substrate such as a flexible tape or film material, which may be formed, e.g., of a polymeric material. An elastomeric O-ring or gasket 300 is provided to seal against entry or moisture or other contamination into the cavity 292. The door 280 is retained in the closed position via a latch member 304 releasably engaging a catch 308 on the main body 136 housing. The door 280 is opened by manually disengaging the latch member 304 from the catch using a latch release 312 disposed on the door 280.

The modular processing board cartridge 296 includes a main board 316 including a processor 320, such as microprocessor, central processing unit, microcontroller, or the like, including an associated memory and processing electronics. A connector interface 324 includes a plurality of electrical contacts 328 which engage aligned electrical contacts 336 on a mating connector 332 disposed in the cavity 292. In embodiments, the contacts 328 are spring loaded pogo pins of the type comprising a barrel, plunger and encapsulated spring and the contacts 336 are complementary contact pads. The modular processing board cartridge 296 allows the processing capability of the battery pack center base module 132 to be swapped and updated. In certain embodiments, the cartridge dimensions and pin locations are controlled with an interface control document (ICD) to provide an open architecture allowing other manufacturers to make their own customized processing units tailored for specific electrical and processing requirements. In such embodiments, the center base module 132 is an "open architecture" platform allowing other manufactures to install their own unique electronic circuitry in the cavity 292.

The modular processing board cartridge 296 includes first and second card slots 340*a* and 340*b* for receiving first and second nonvolatile memory cards 344*a* and 344*b*, respectively, such as flash memory cards, Secure Digital (SD) cards, or the like. The modular processing board cartridge 296 is inserted and removed via the hatch door 280. In certain embodiments, one of the card slots 340*a*, 340*b* is used for expandable storage, to upload mission profiles, and/or for software/firmware upgrades, and the other one of the card slots 340*a*, 340*b* is used for programming logic and the operating system.

The first and second nonvolatile memory cards 344*a* and 344*b* are inserted and removed from the first and second card slots 340*a* and 340*b* through an opening 348 in the bottom surface 144 of the battery pack center base module 132. The opening 348 is covered by a bottom door 352 which is attached to the main body 136 via a hinge 356. An elastomeric O-ring or gasket 360 provides a sealing interference between the door 352 and the main body 136 to prevent entry of moisture or other contamination into the cavity 292 or cartridge 296. A releasable latch 364 on the bottom door 352 engages a catch 368 on the main body 136.

Figure 26:
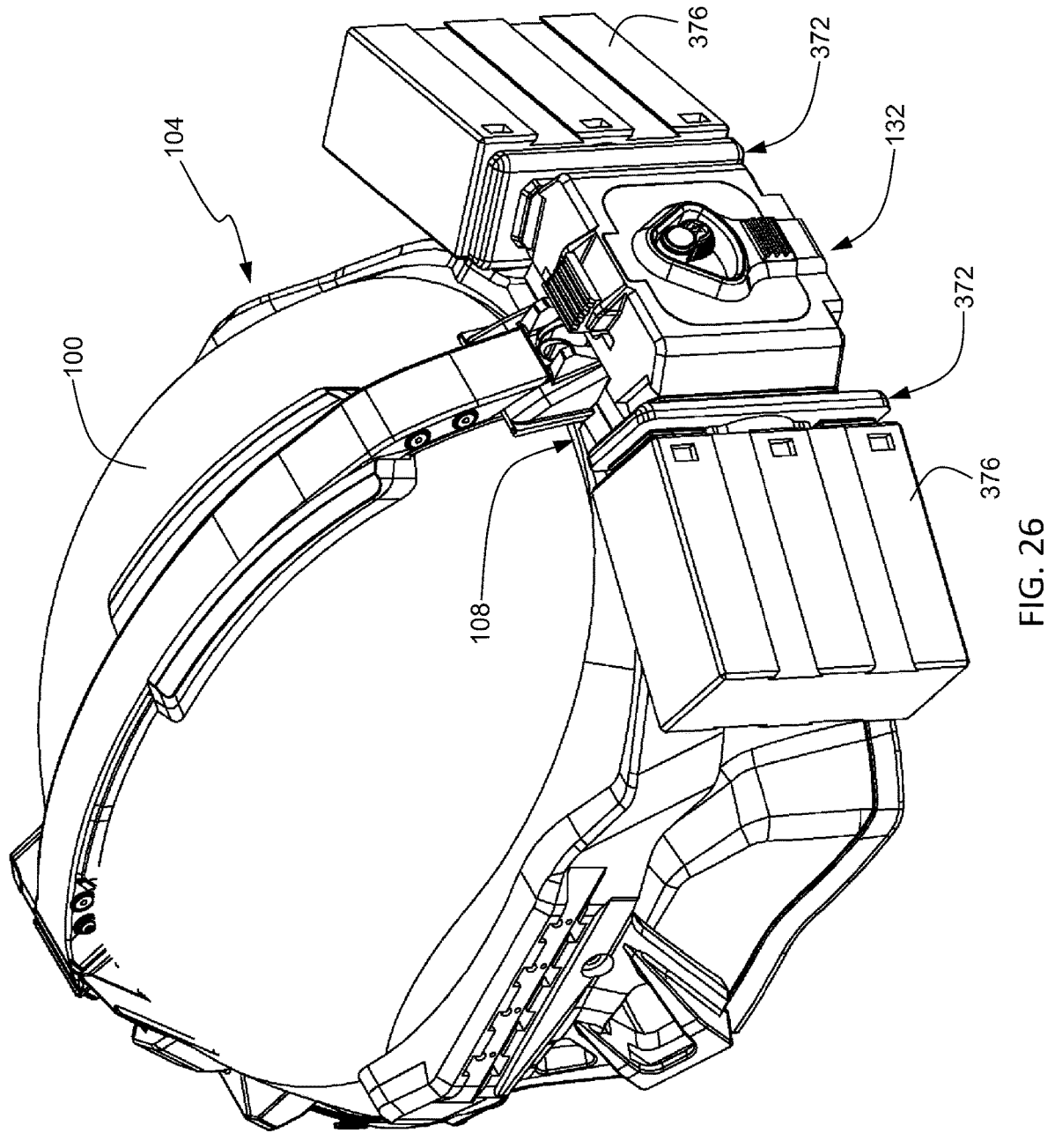
FIG. 26 is an isometric view of a further exemplary embodiment powered helmet mounting assembly attached to a helmet taken generally from the rear and left side, the powered helmet mounting assembly having the first embodiment battery pack center base module attached to a rear mount assembly of the powered helmet mounting assembly, the battery pack center base module further including left and right battery pack adapters for removably attaching battery packs in accordance with the Small Tactical Universal Battery (STUB) standard (e.g., Department of Defense MIL-PRF-32383).

Referring now to FIG. 26 and with continued reference to FIGS. 1-25, there is shown a helmet 100 with helmet mount assembly 104 with the rear battery mounting bracket 108 receiving the battery pack center base module 132, as shown in FIG. 1, wherein the battery pack center base module 132 has left and right Small Tactical Universal Battery (STUB) battery packs 376 attached to each of the left and right side surfaces 148 of the battery pack center base module 132 via STUB adapters 372.

Figure 27:
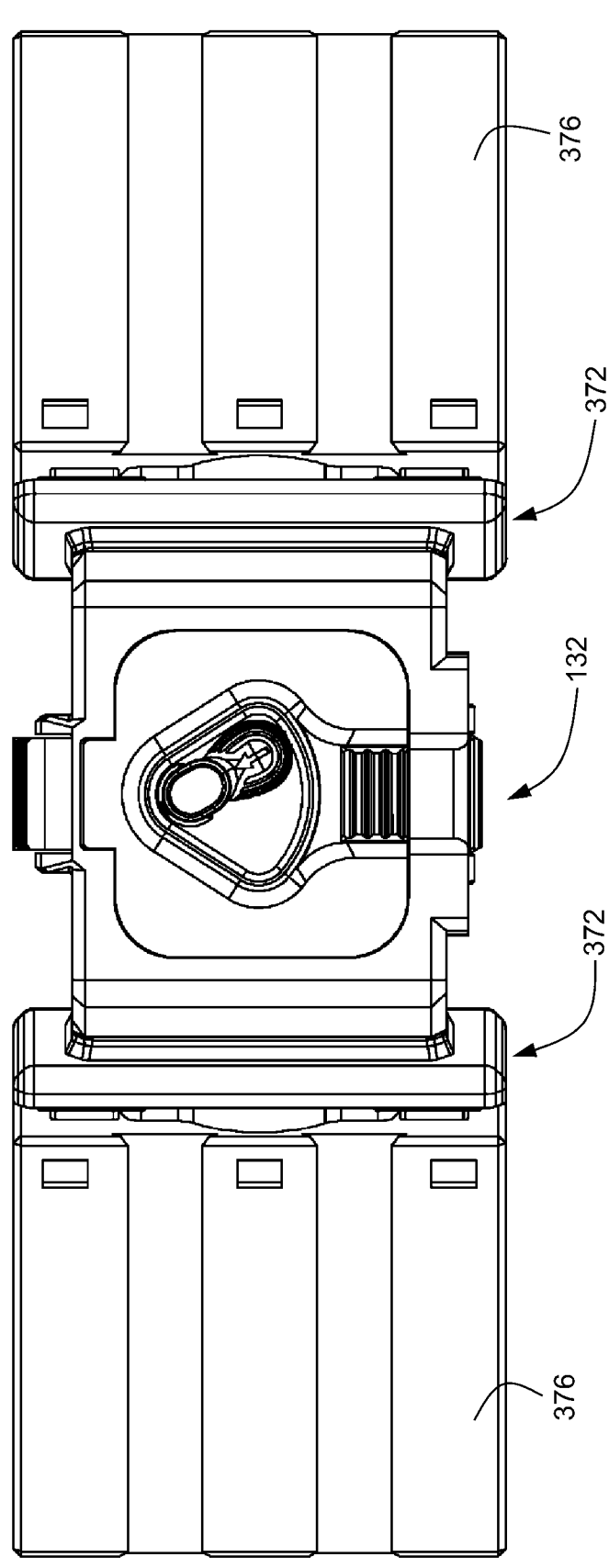
FIG. 27 is a rear elevational view of the battery pack center base module and two attached STUB battery packs.
Figure 28:
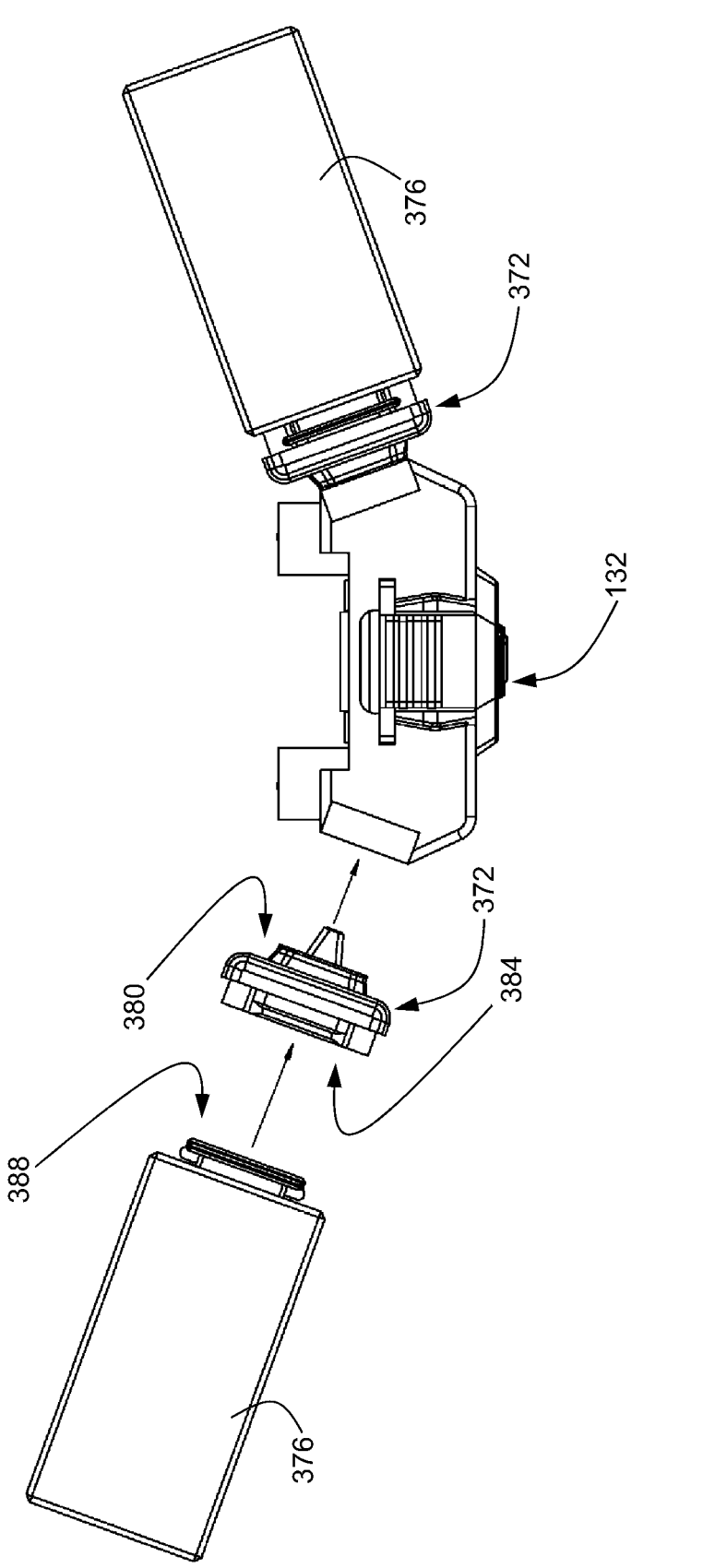
FIG. 28 is a partially exploded view of the battery pack center base module and STUB battery packs appearing in FIG. 27.

Referring now to FIGS. 27 and 28, and with continued reference to FIGS. 1-26, each STUB adapter 372 has a first interface surface 380 configured to detachably engage with the side surfaces 148 on the battery pack center base module 132 and a second interface surface 384 opposite the first interface surface 380 configured to detachably engage with a standard STUB battery pack interface 388.

Figure 29A:
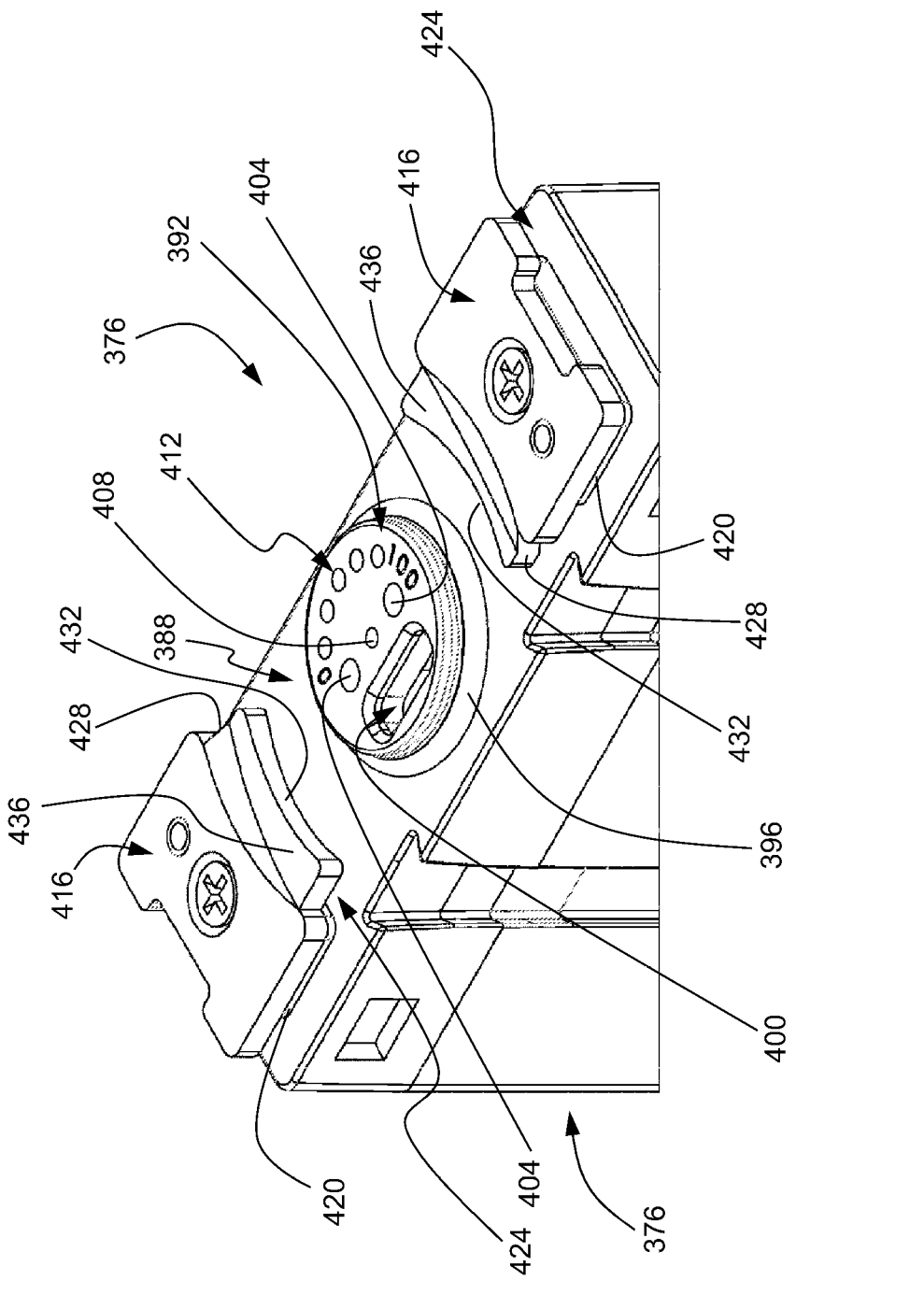
FIG. 29A is a fragmentary isometric view of an exemplary STUB battery pack useable with the present development.
Figure 29B:
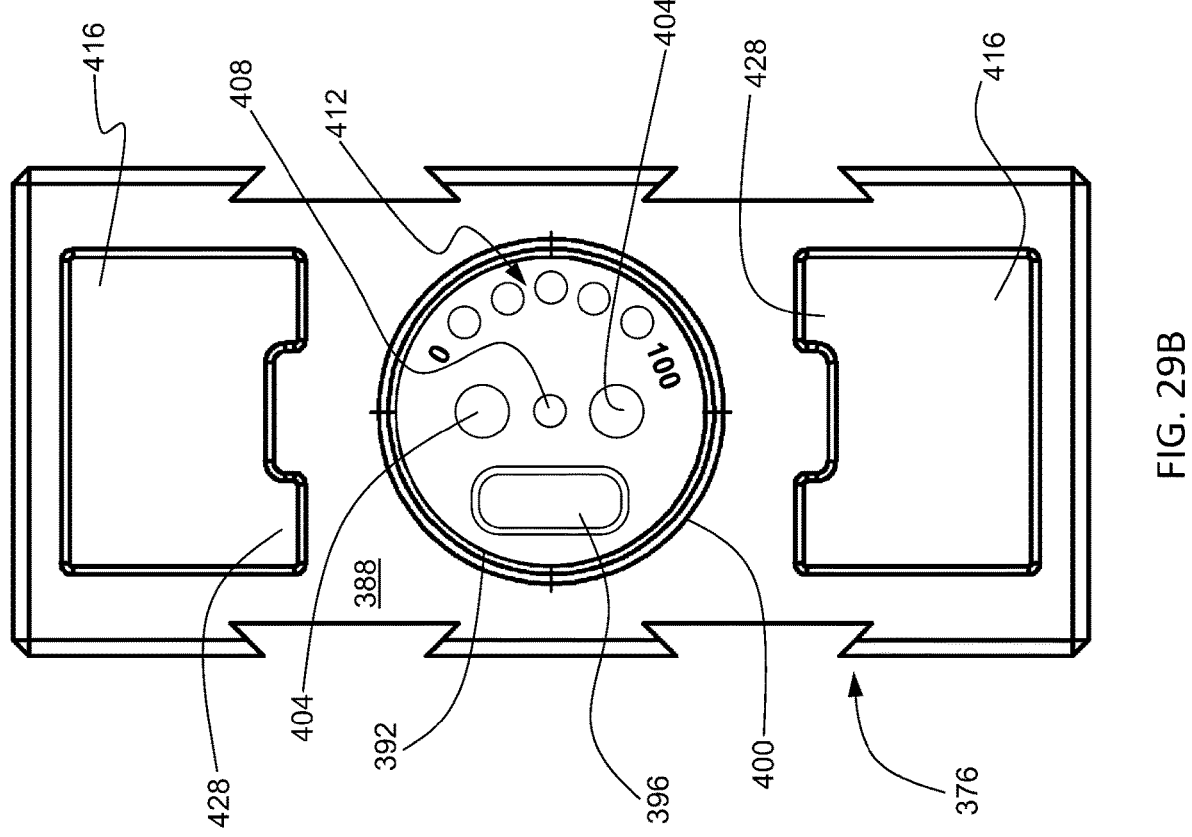
FIG. 29B is a top view of an exemplary STUB battery pack useable with the present development.

Referring now to FIGS. 29A and 29B, and with continued reference to FIGS. 1-28, there is shown an exemplary STUB battery pack 376 which comprises an interface surface 388. In the illustrated embodiment, the STUB interface surface 388 includes a center terminal 392. The center terminal includes an elastomeric sealing ring 396 for sealing between the terminal 392 and the housing of the battery pack 376. The terminal 392 includes a USB-C charging port 400, power terminals 404 404, a control signal terminal 408, and state of charge indicia 412. In certain embodiments, the STUB battery pack 376 may be generally as described in U.S. Patent Application Publication No. 2022/0216554 published on Jul. 7, 2022, which is incorporated herein by reference in its entirety.

Tabs 416 are disposed at opposing ends of the interface surface 388 and are supported on respective posts or bosses 420 (see FIG. 35) to define a peripheral retention channel 424 between the tabs and the interface surface 388. The tabs 416 include bayonet or twist type retention elements 428 for attachment of the battery pack 376 to the adapter surface 384 via twisting movement of the battery pack 376 relative to the stub adapter second interface surface 384.

Figure 30:
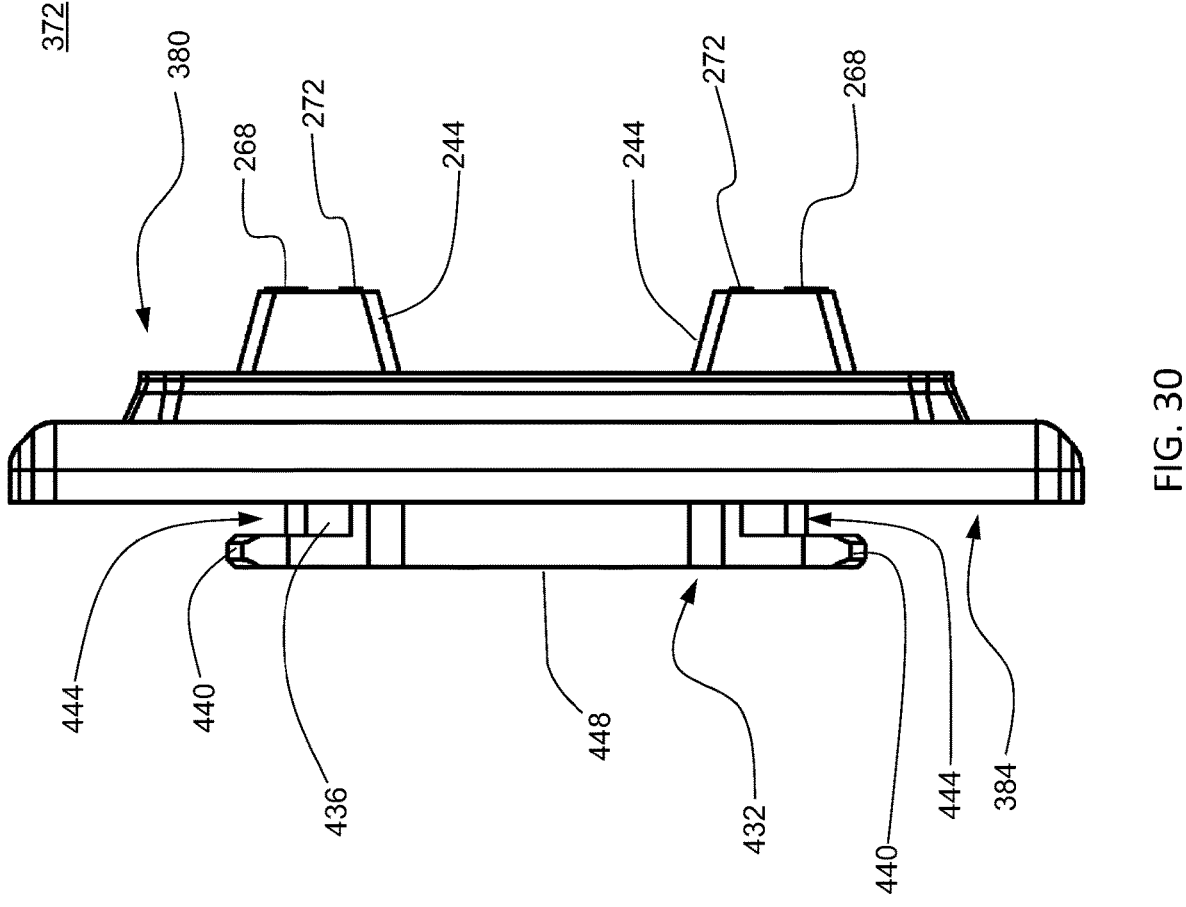
FIG. 30 is a side elevational view of the STUB battery pack adapter.
Figure 31:
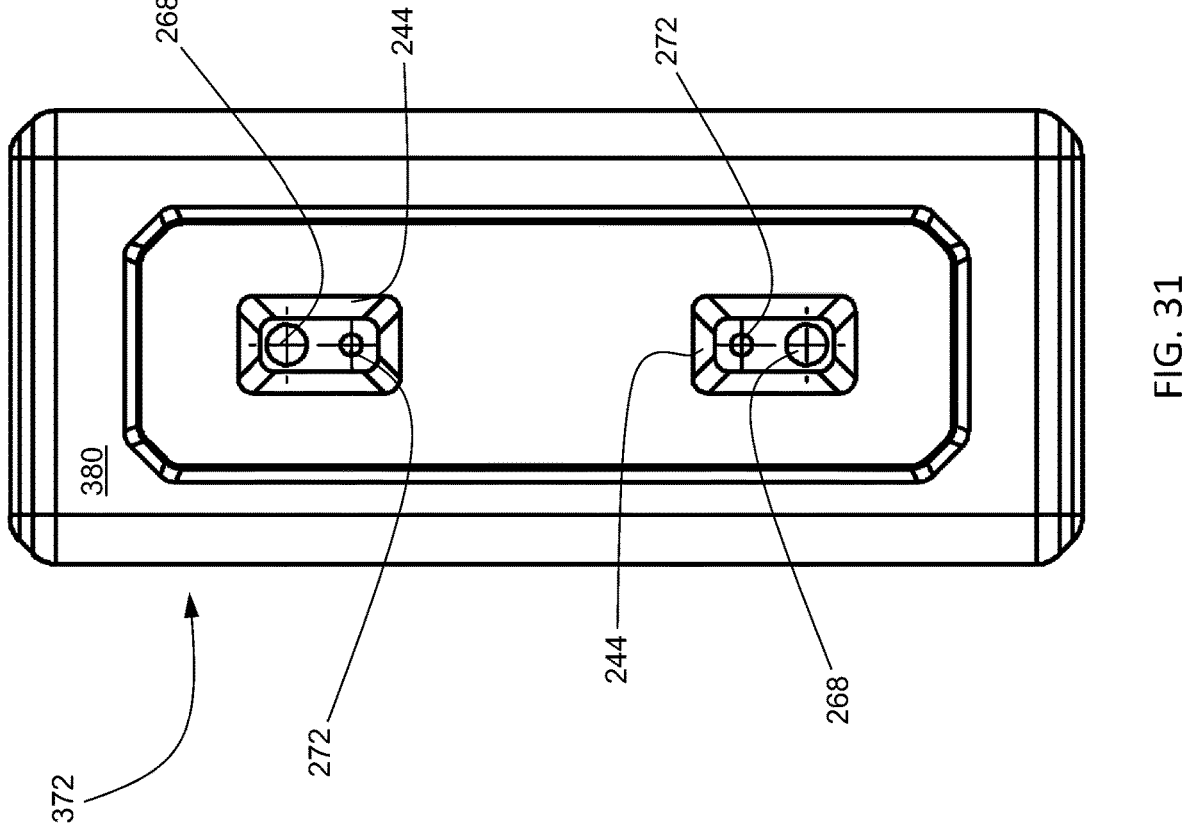
FIG. 31 is a first end elevational view of the STUB battery pack adapter illustrating the connection interface for attaching the STUB battery pack.
Figure 32:
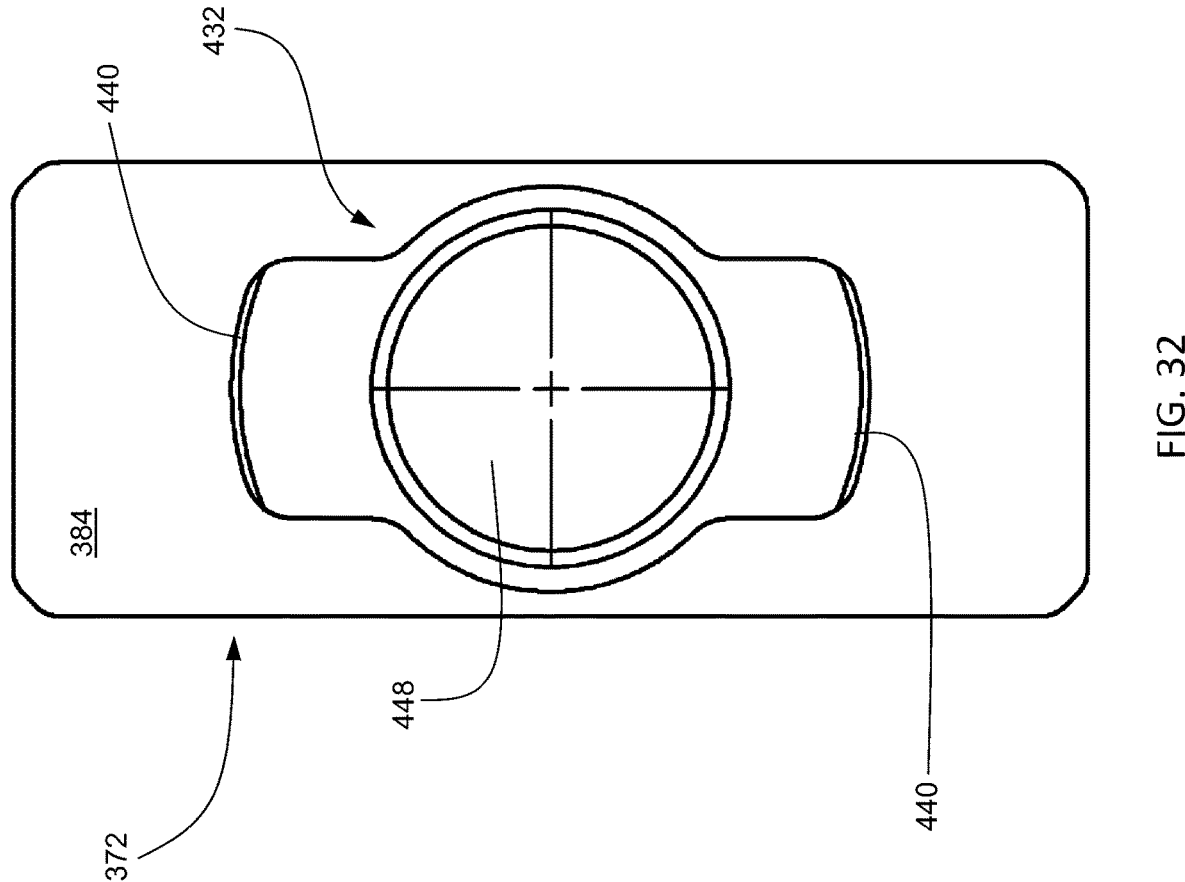
FIG. 32 is a second end elevational view of the STUB battery pack adapter illustrating the connection interface for attaching the STUB battery pack adapter to the battery pack center base module.

Referring now to FIGS. 30-32, and with continued reference to FIGS. 1-29B, the adapter first interface surface 380 includes a pair of connector lugs 244 as described above each having a magnet fastener element 268 and an electrical connector element 272. The adapter 372 is physically attached and detached from the side surfaces 148 of the battery pack center base module 132 via the magnetic fastener elements as described above.

The second adapter interface surface 384 includes a bayonet type mount 432 including a center post 436 and opposing ears 440. The ears 440 extend from the post 436 to define a retention groove 444 between each of the ears 440 and the surface 384. A center terminal 448 on the bayonet mount assembly 432 is aligned with the center terminal 392, which includes terminals that are electrically coupled to the terminals 272 on the first interface surface 380 to electrically couple the battery pack 376 to the battery pack center base module 132.

In operation, to attach the battery pack 376 to the adapter second interface surface 384, the battery pack 376 is positioned so that the center terminals 392 and 448 are aligned and the twist retention elements 428 on the STUB battery pack 376 are angularly offset with respect to the bayonet ears 440 on the adapter second interface 384. The STUB battery pack 376 is then rotated to cause the twist retention elements 428 to engage the retention grooves 444. To remove the battery pack 376 from the adapter second interface surface 384, the process is reversed.

Figure 33:
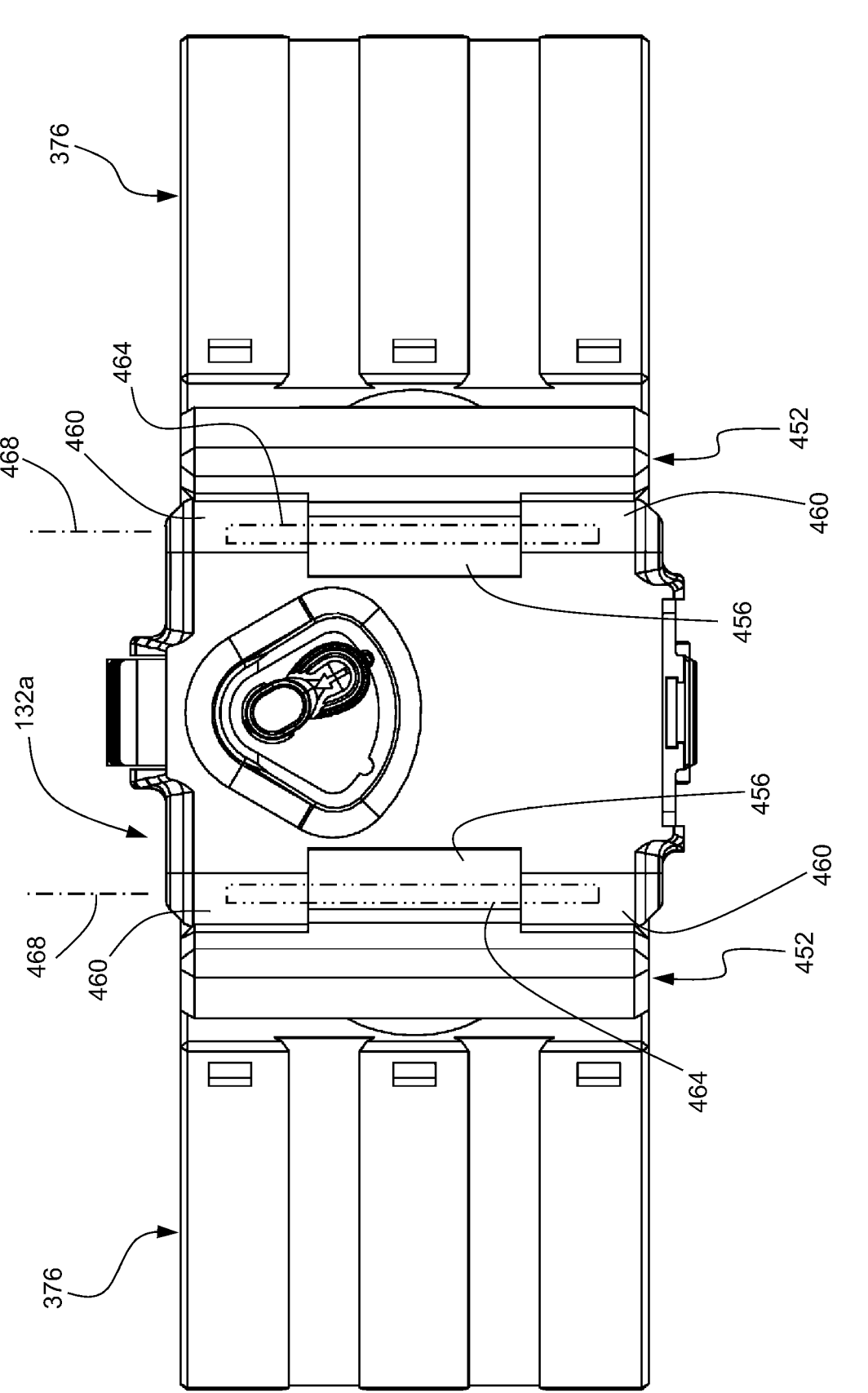
FIG. 33 illustrates a second embodiment battery pack center base module with a hinged interface configured for removably attaching STUB battery packs.
Figure 34:
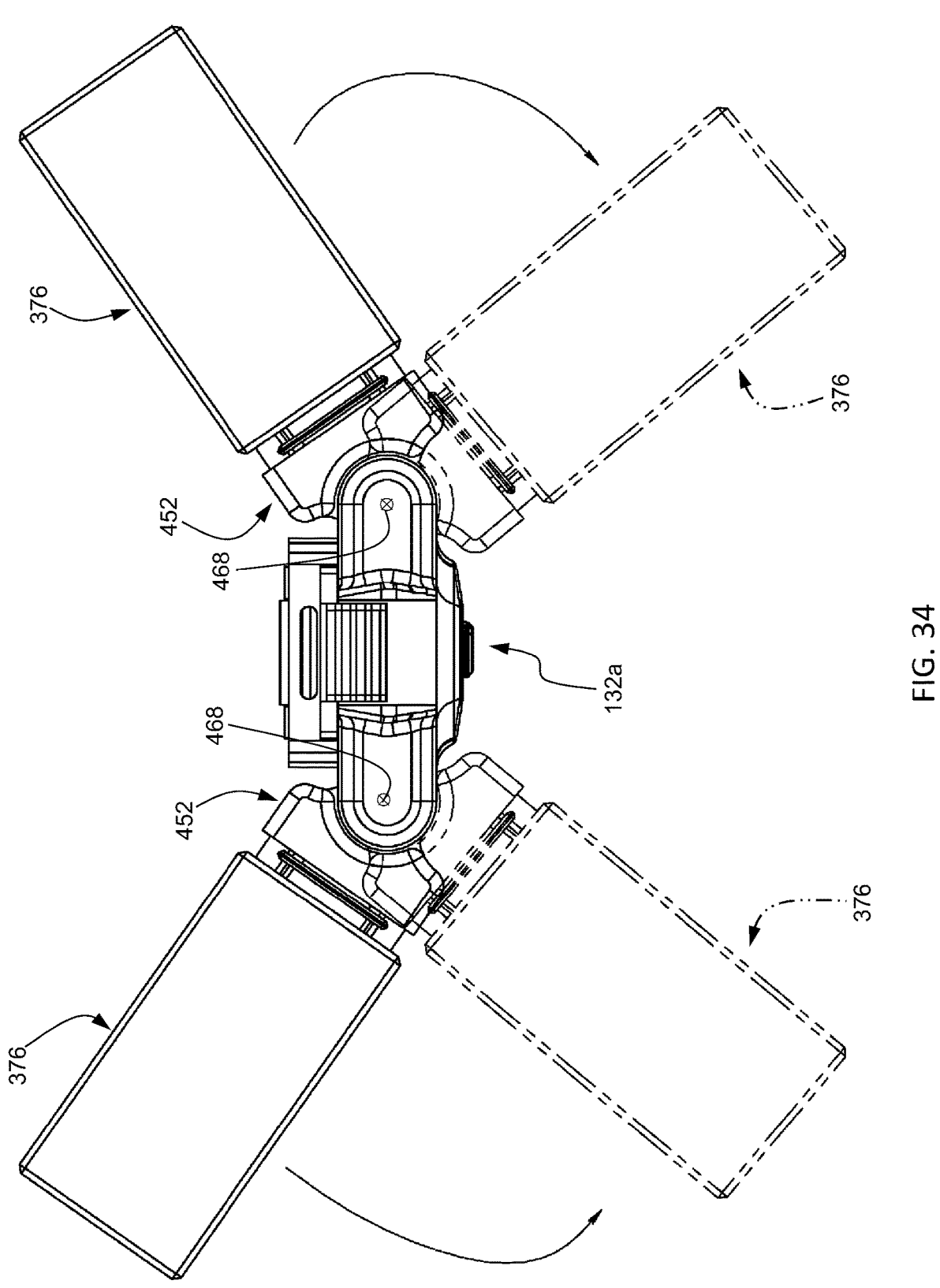
FIG. 34 is a top plan view of the battery pack center base module with left and right attached STUB battery packs, showing the range of pivoting hinge movement allowing the STUB battery packs to be pivoted in relation to the battery pack center base module toward and away from the helmet.
Figure 35:
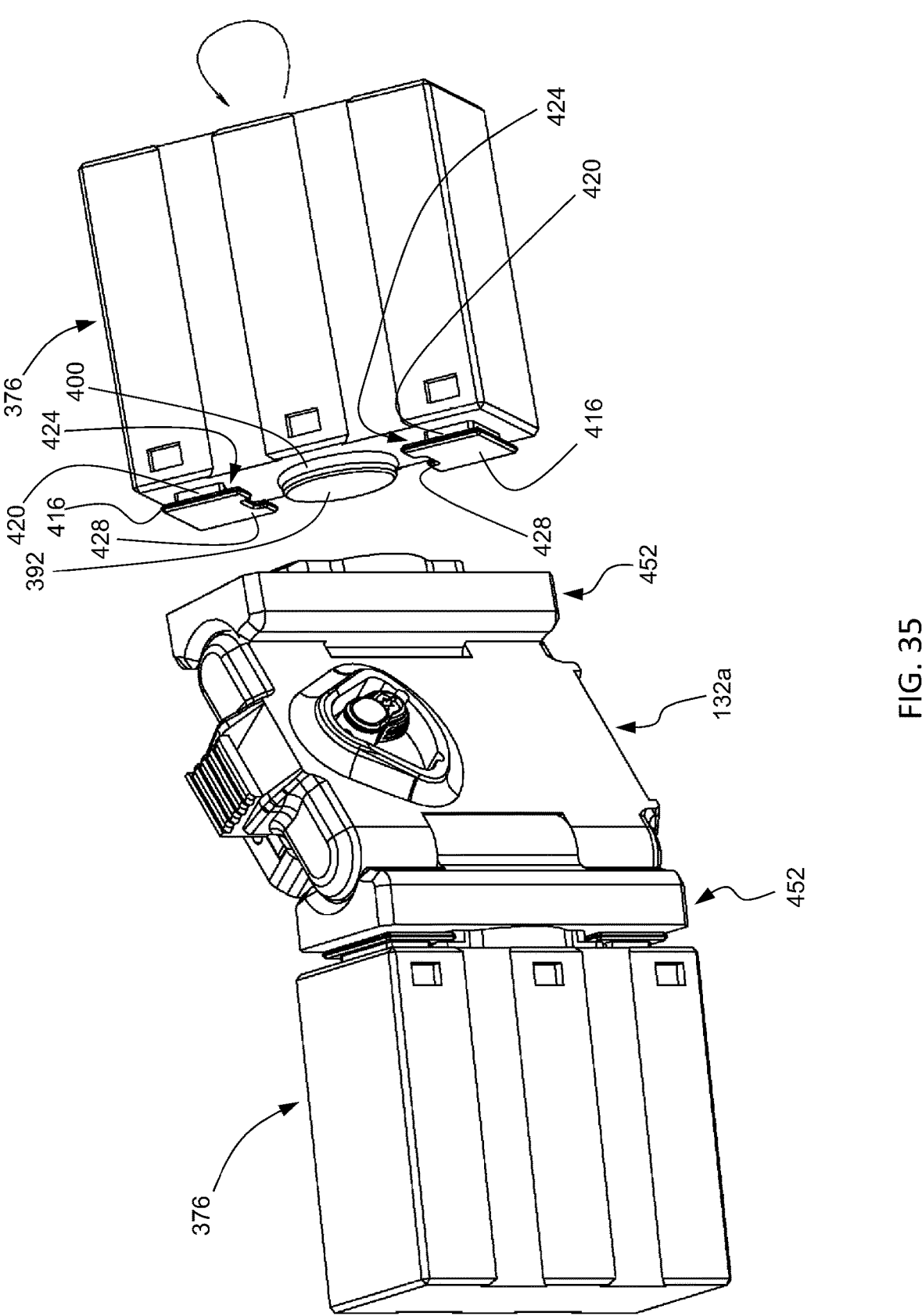
FIG. 35 is an isometric view of the battery pack center base module with left and right STUB battery packs, illustrating the manner of attaching and detaching the STUB battery packs.

Referring now to FIGS. 33-35 and with continued reference to FIGS. 1-32, there is shown a second embodiment battery pack center base module 132a, which is as described above by way of reference to the battery pack center base module 132, except that the left and right side surfaces 148 have been replaced with hinged STUB attachment interface assemblies 452.

In certain embodiments, the hinge interface assemblies 452 each include a hinge knuckle 456 intermeshed between two hinge knuckles 460 on a main body 136a of the battery pack center base module 132a and rotatably attached with a hinge pin 464, each defining a pivot axis 468. As best seen in FIG. 34, the hinged connection allow the battery packs 376 to be pivoted about the axis 468 toward the helmet during normal use (as shown in solid lines in FIG. 34), and to be pivoted away from the helmet (as shown in broken lines in FIG. 34) when it is desired to remove or replace the battery pack 376.

Figure 36:
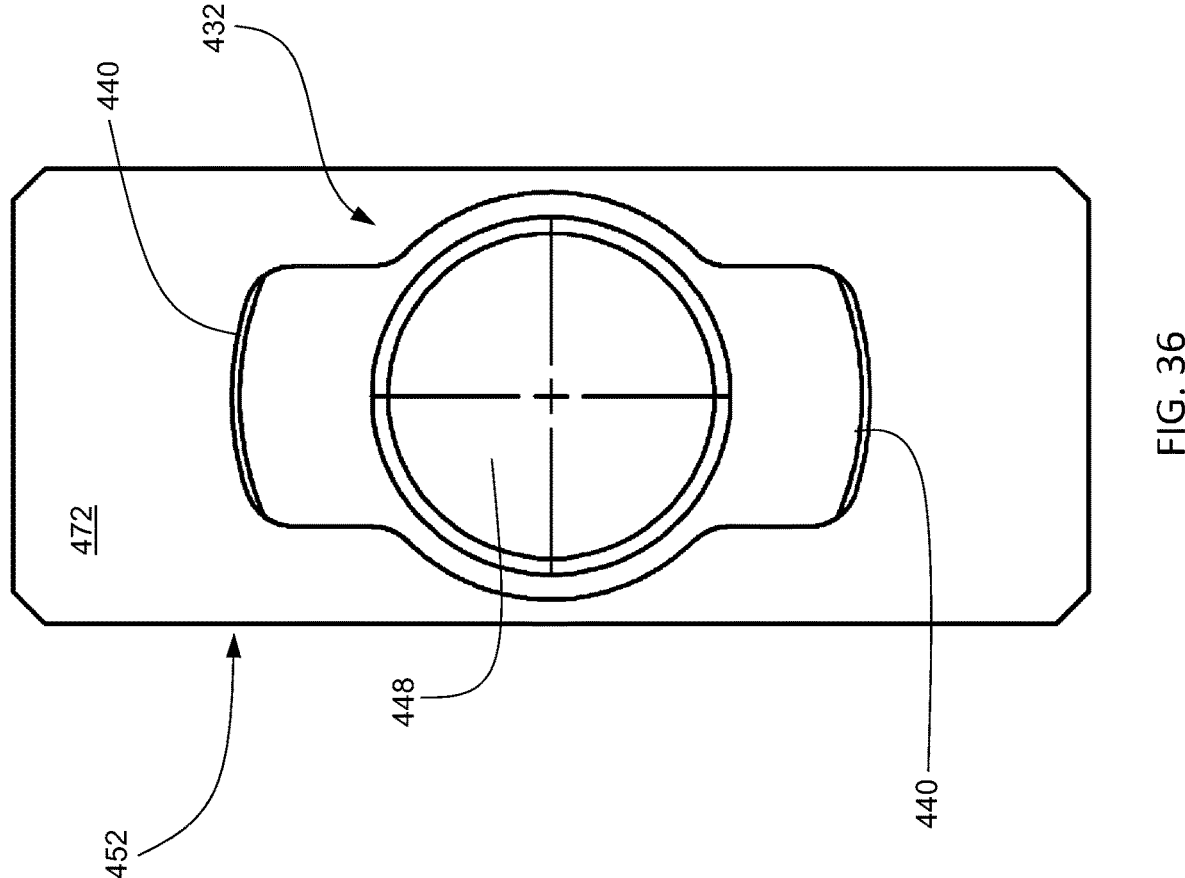
FIG. 36 is an elevational view of the hinged connector on the battery pack center base module, illustrating the connection interface of the hinged connector.

Referring now to FIG. 36, and with continued reference to FIGS. 1-35, there is shown an interface surface 472 of the hinge assembly 452 which is configured to detachably engage with the interface surface 388 (see FIGS. 29A and 29B) of the STUB battery pack 376. The interface surface 472 includes a bayonet type mount 432 including a center post 436 (see FIG. 30) and opposing ears 440. The ears 440 extend from the post 436 to define a retention groove 444 (see FIG. 30) between each of the ears 440 and the surface 472. A center terminal 448 on the bayonet mount assembly 432 is aligned with the center terminal 392, which includes terminals that engage the terminals 404 to electrically couple the battery pack 376 to the battery pack center base module 132a.

In operation, to attach the battery pack 376 to STUB hinge interface 472, the battery pack 376 is positioned so that the center terminals 392 and 448 are aligned and the twist retention elements 428 on the STUB battery pack 376 are angularly offset with respect to the bayonet ears 440 on the hinge interface 472. The STUB battery pack 376 is then rotated to cause the twist retention elements 428 to engage the retention groove 444. To remove the battery pack 376 from the hinge interface 472, the hinged adapter 452 is pivoted so that the interface surface 472 faces away from the helmet and battery pack 376 is twisted until the twist retention elements 428 disengage from the retention grooves 444.

Figures 37, 38, 39:
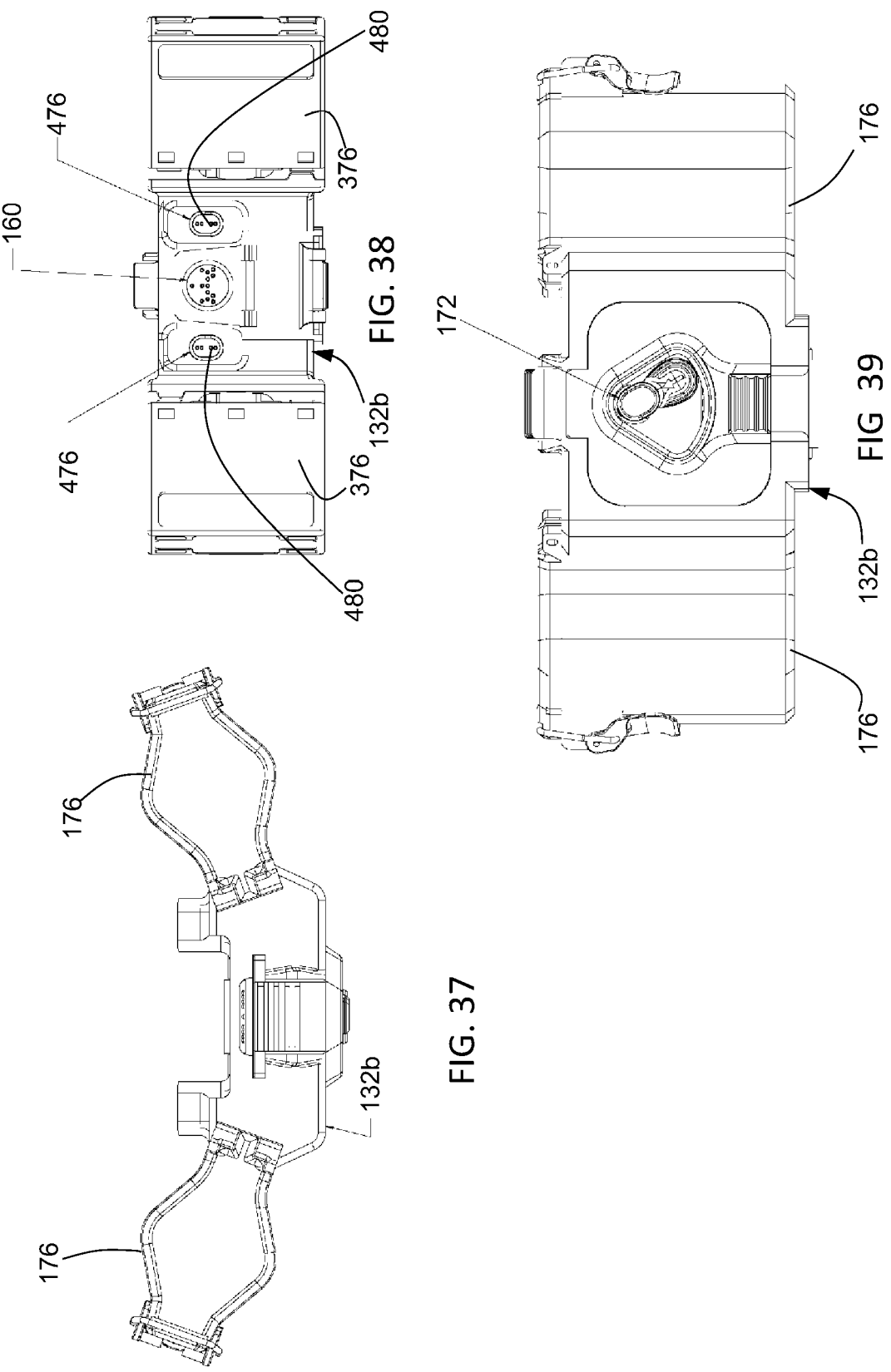
FIG. 37 is a top view of a battery pack center base module with left and right battery packs, in accordance with a third embodiment.
FIG. 38 is a front view of the battery pack center base module with left and right battery packs appearing in FIG. 37.
FIG. 39 is a rear view of the battery pack center base module with left and right battery packs appearing in FIG. 37.

Referring now to FIGS. 37-39, there is shown a third embodiment battery pack center base module 132b with left and right battery packs. In FIGS. 37 and 39, the battery packs are battery packs 176. In FIG. 38, the battery packs are STUB battery packs 376. The battery pack center base module 132b includes left and right power and data connectors 476 having power and data contacts 480. The left and right power and data connectors 476 are disposed on opposite sides of the hot shoe receptacle 160. In embodiments, the battery pack center base module 132b may be in other respect as described above by way of reference to the battery pack center base module 132 except as other otherwise specified herein.

Figure 40:
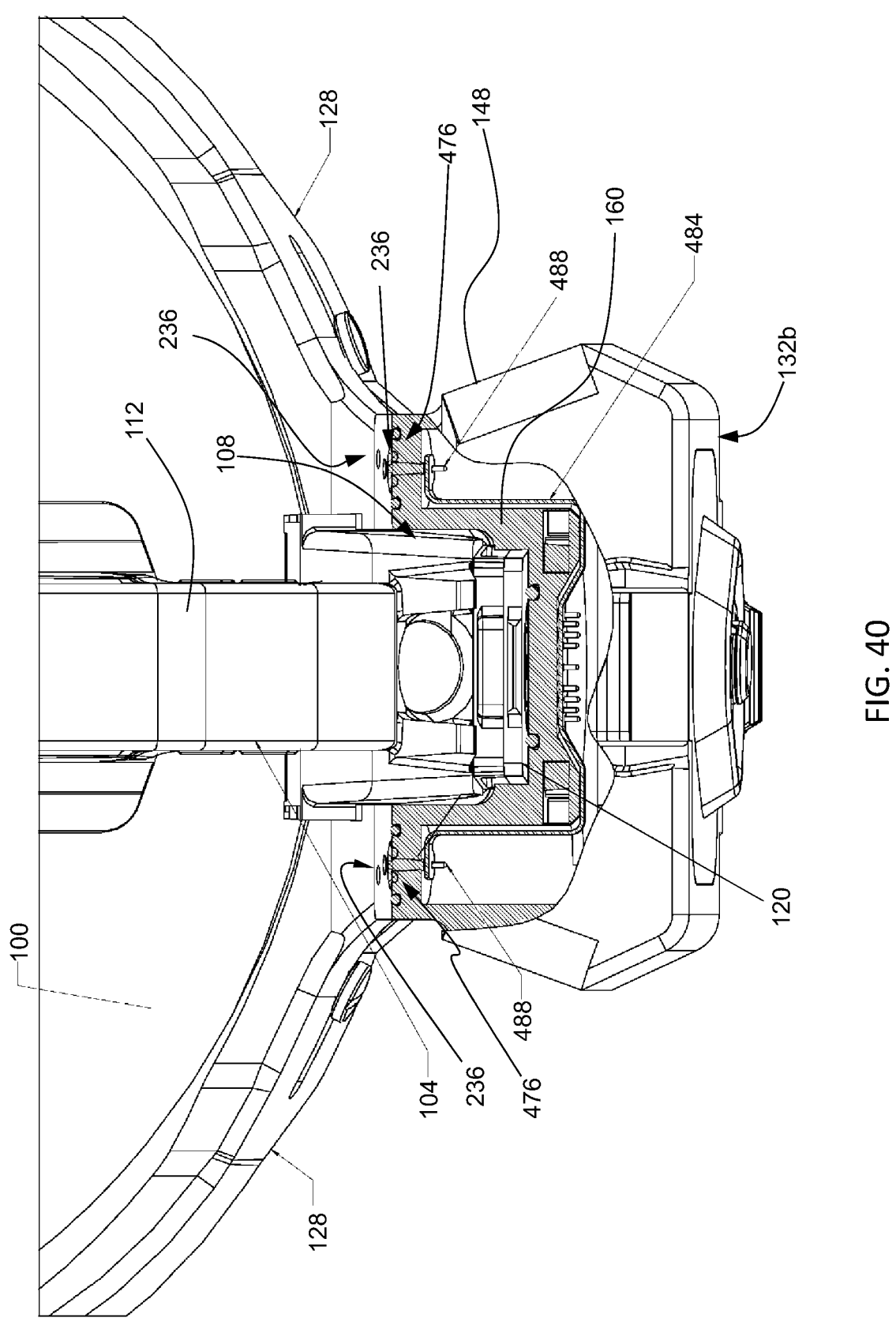
FIG. 40 is a fragmentary top view of the helmet with powered helmet mounting assembly, with the battery pack center base module of FIG. 37 attached to the rear mount assembly on the powered helmet mounting assembly.

As best seen in FIG. 40, the connectors 480 on the battery pack center base module 132a connect to corresponding the left and right side shrouds or brackets 128 of the helmet mount assembly 104. A circuit board 484 is disposed within the housing of the battery pack center base module 132b which has left and right power and data contacts 488 thereby electronically and electrically bridging the bridging the left and right ear brackets 128. The circuit board 484 is also operably coupled to the circuitry within the center strap/cable cover 112 via the hot shoe interface 120 Finally, the circuit board 484 is operably coupled to the control board or processing board 296 in the battery pack center base module 132b. In this manner the battery pack center base module 132b has a connections to bridge or tie the right and left ear brackets 128 together as well as connect the control board in the battery box to the helmet mount assembly 104.

Figure 41:
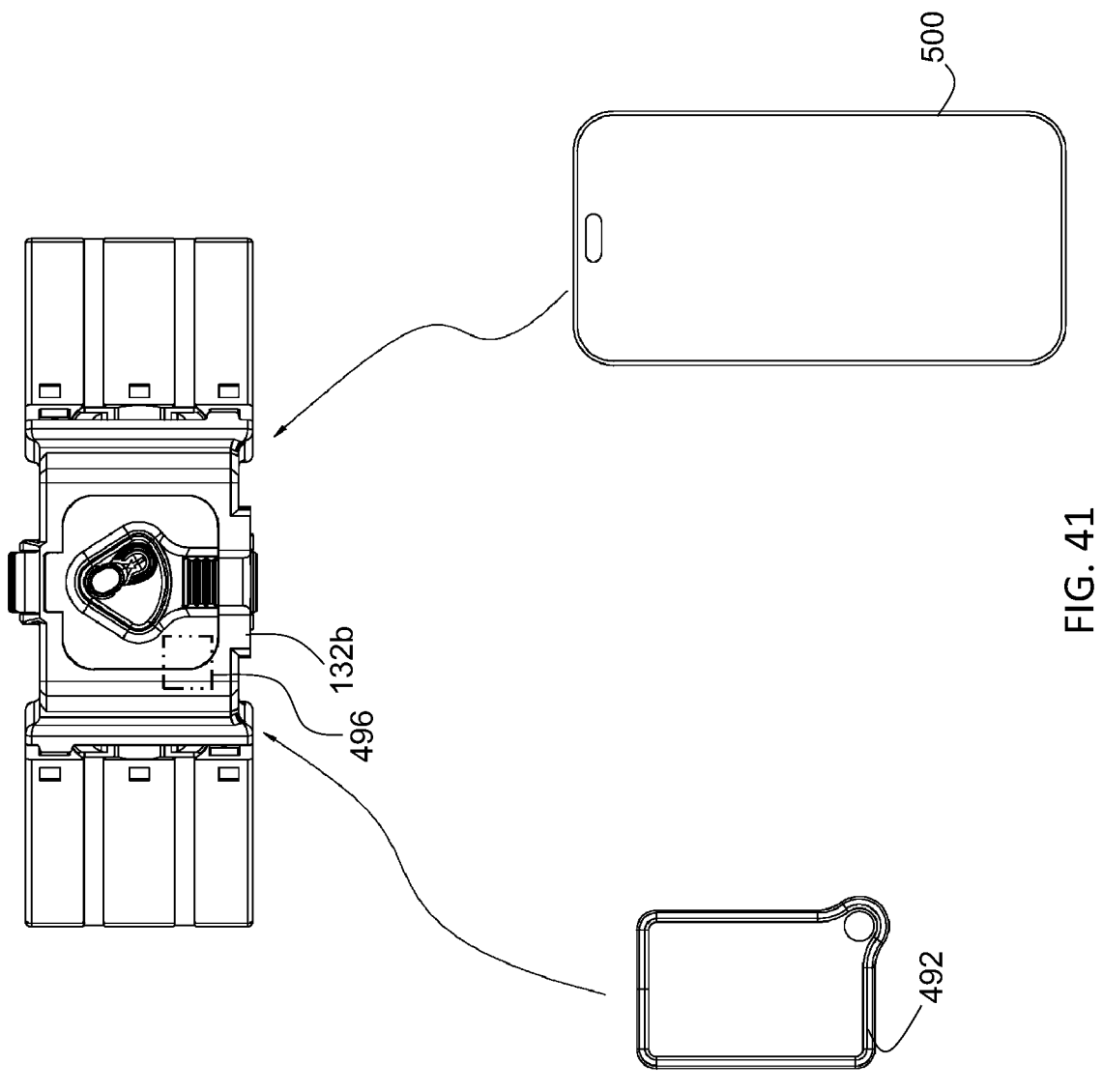
FIG. 41 illustrates two alternative methods of programming a modular processing board cartridge within the battery pack center base module.
Figures 42, 43, 44, 45:
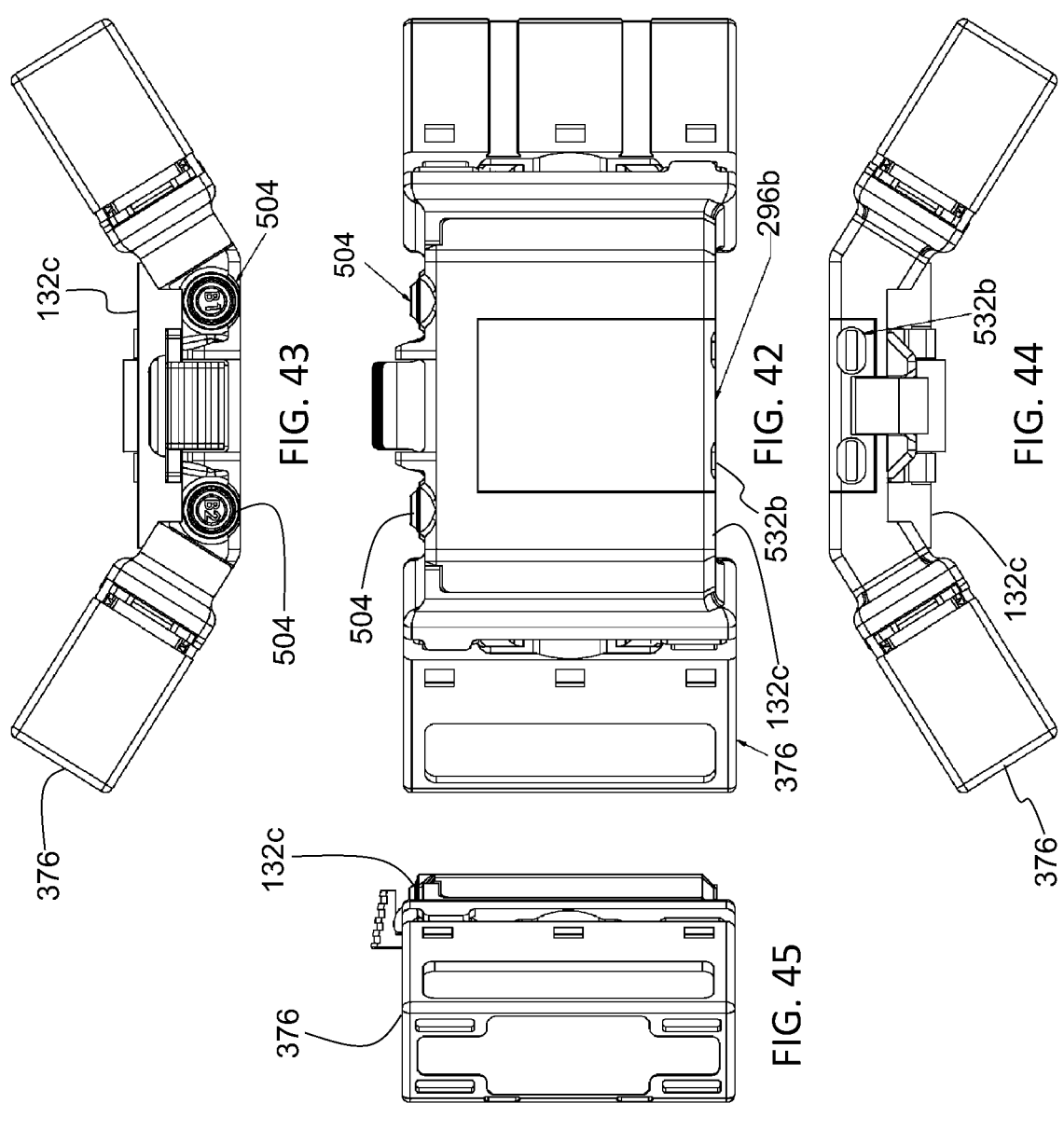
FIG. 42 is a rear view of a battery pack center base module with left and right battery packs, in accordance with a fourth embodiment.
FIG. 43 is a top view of the battery pack center base module with left and right battery packs appearing in FIG. 42.
FIG. 44 is a bottom view of the battery pack center base module with left and right battery packs appearing in FIG. 42.
FIG. 45 is a side view of the battery pack center base module with left and right battery packs appearing in FIG. 42.

FIG. 41 illustrates two alternative methods of programming a modular processing board cartridge 296 within the battery pack center base module 132b, e.g., for a specific mission profile.

In a first programming method, the modular processing board cartridge 296 within the battery pack center base module 132b is programmed using an application on a mobile phone or other mobile device 500 which is paired with the battery pack center base module 132b via an RF communication protocol, such as Bluetooth.

In a second method, a wireless RFID (Radio Frequency Identification) token or tag 492 is provided, which uses radio waves to communicate with an RFID reader 496 within the battery pack center base module 132b. The token 492, which may be active or passive is advantageously used for changing the configuration of multiple battery pack center base modules for mass programming.

Referring now to FIGS. 42-46, there is shown a fourth embodiment battery pack center base module 132c, which is configured for use with an interface control document (ICD) controlled smart cartridge. The battery pack center base module 132c may be generally as described above by way of reference to the battery pack center base module 132, except that rather than the battery lever switch for selecting between the left and right battery packs, dedicated left and right push button battery selector switches 504 are provided. In operation, each battery source can be activated by pressing the respective button 504. The right and left side batteries each have button activation control, B1 and B2, respectively. By selecting B1, the device will use power from battery 1 and disconnect power from battery 2, and vice versa. In embodiments, the push button switches are operable to provide uninterrupted power when switching between batteries to prevent inadvertently power cycling an attached accessory device.

Figure 46:
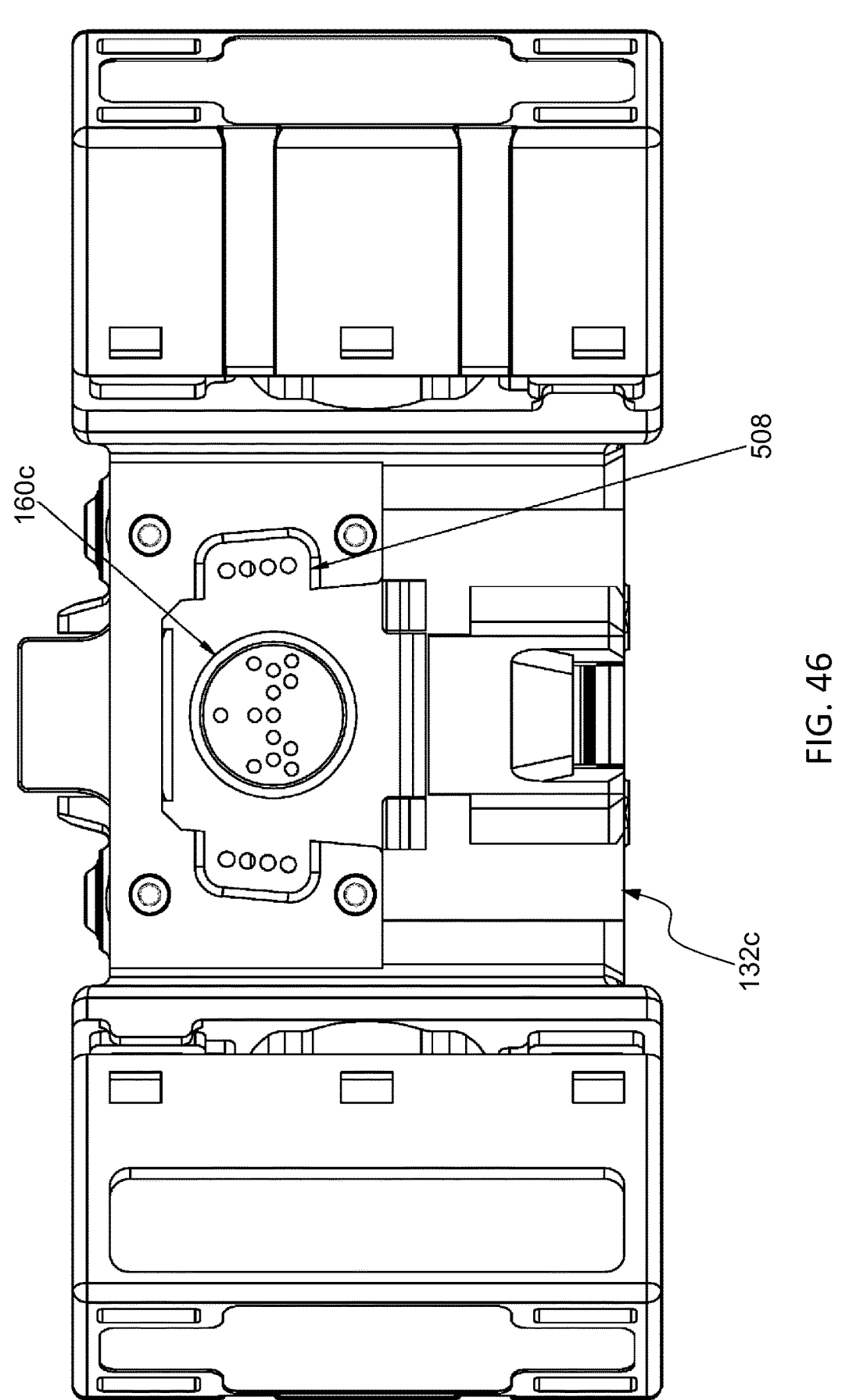
FIG. 46 is a front view of the battery pack center base module with left and right battery packs appearing in FIG. 42.
Figure 47:
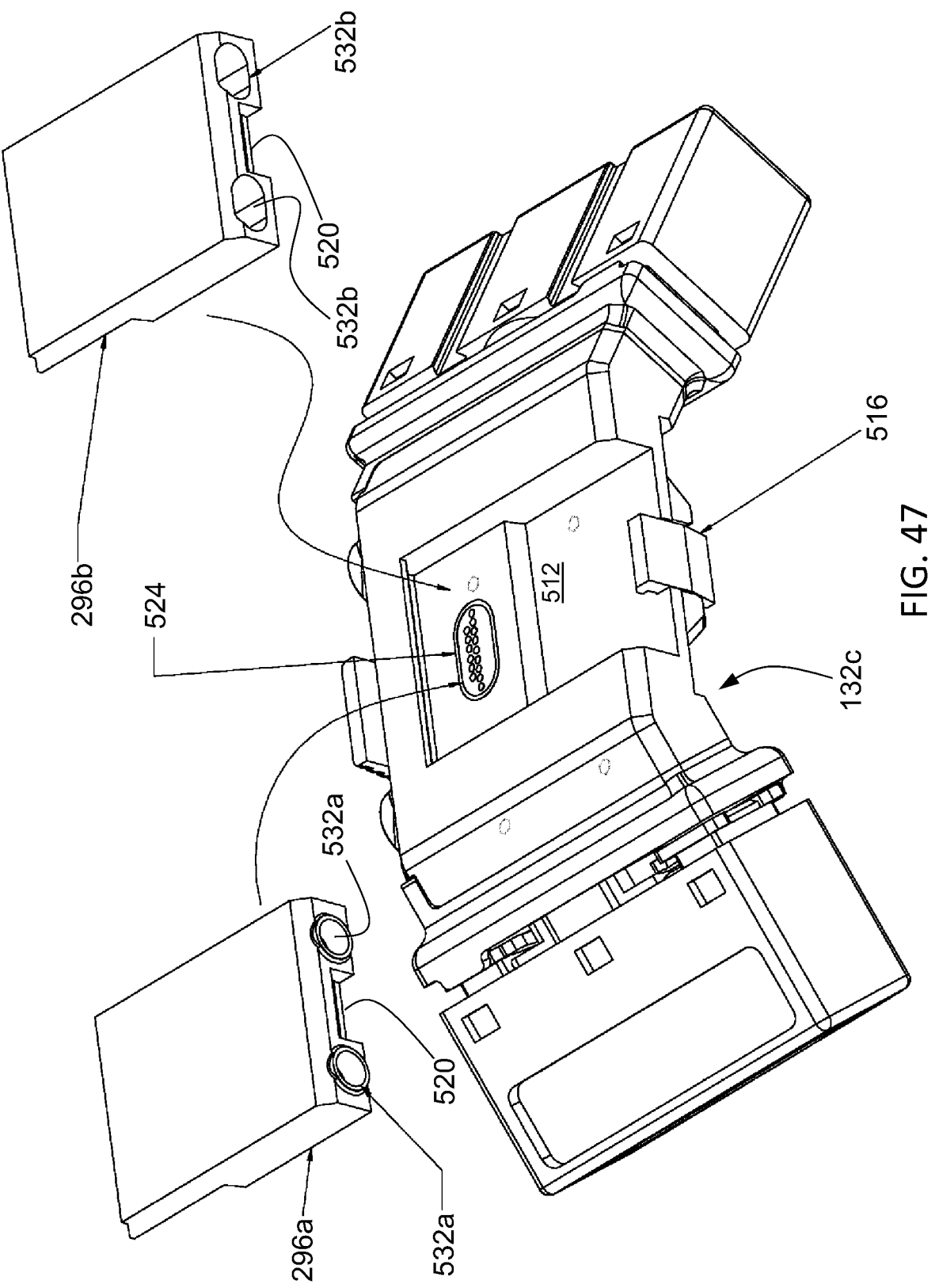
FIG. 47 is an isometric view of a battery pack center base module appearing in FIG. 42, showing interchangeability of multiple cartridge styles.

Referring now to FIG. 46, the battery pack center base module 132c has a modified hot shoe interface 160c which has additional hot shoe pins 508 to connect the helmet mount assembly 104 to the battery pack center base module 132c. This bridges power and data from the control cartridge 296a, 296b (see FIGS. 47-52, through the battery pack center base module 132c and helmet mount assembly 104 to the powered side rail interfaces 128, the identification friend or foe system (IFF) 124, as well as headset, flashlight, and other integrated systems. In embodiments, an Interface Control Document is provided to specify, e.g., the pin-out and electrical characteristics of each contact, their functions (power, data, ground, drain, control signals, etc.), voltage levels, signal types, and other relevant parameters.

Referring now to FIGS. 47-52, the battery pack center base module 132c includes a recess or receptacle 512 configured to interchangeably receive a plurality of cartridge styles 296a, 296b. A latch 516 engages a complementary catch 520 on the cartridge 296a, 296b to releasable retain the cartridge 296a, 296b within the receptacle 512. An electrical interface 524 within the receptacle 512 operably engages a mating electrical interface 528 on the cartridge 296a, 296b. As best seen in FIG. 50, the cartridge 296a, 296b housing has a stepped profile which is complementary with the profile of the receptacle 512. In interface connection preferably uses sealing elements to ingress of moisture, dust, or other external contamination.

Referring now to FIGS. 48-50, there is shown a first cartridge style 296a, which includes Fischer connectors 532a. Fischer connectors are commercially available from Fischer Connectors SA (Saint-Prex, Switzerland). Referring now to FIGS. 51 and 52, there is shown a second cartridge style 296b, which includes USB Type-C connectors 532b. In embodiments, the connectors 532b are ruggedized U.S.C. § Type-C connectors. The connectors 532a, 532b provide a power, data, and/or control input and/or output interface to the battery pack center base module 132c and helmet mount assembly 104 powered side rail interfaces 128.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

14

What is claimed is:

1. A bridge link battery interface for a helmet accessory mounting system, the bridge link battery interface comprising:
   a housing enclosing a circuit;
   an electrical and mechanical coupling interface structured and operable to connect to an attachment point on the helmet accessory mounting system;
   a first battery interface configured for detachable coupling to a first battery pack;
   a second battery interface configured for detachable coupling to a second battery pack;
   a first electrical connector assembly disposed on the housing and electrically coupled to the circuit;
   a second electrical connector assembly disposed on the housing and electrically coupled to the circuit;
   wherein said circuit is operable to selectively electrically couple the first and second battery interfaces to the first and second electrical connector assemblies;
   first and second adapters;
   the first adapter having a first interface surface configured for removable attachment to the battery interface and a second interface surface configured for removable attachment to the first battery pack; and
   the second adapter having a third interface surface configured for removable attachment to the second battery interface and a fourth interface surface configured for removable attachment to the second battery pack;
   wherein each of the second and fourth interface surfaces are configured to detachably couple to a Small Tactical Universal Battery (STUB) battery.

2. The bridge link battery interface of claim 1, wherein the electrical and mechanical coupling interface is a hot shoe receptacle structured and operable to detachably connect to a hot shoe assembly on the helmet accessory mounting system.

3. The bridge link battery interface of claim 1, wherein the circuit is operable to couple the first electrical connector assembly to the second electrical connector assembly.

4. The bridge link battery interface of claim 1, wherein the circuit comprises a switch for selectively coupling a selected one of the first and second battery interfaces to the first and second electrical connector assemblies.

5. The bridge link battery interface of claim 1, in combination with the helmet accessory mounting system and a helmet.

6. The bridge link battery interface of claim 1, further comprising a processing unit configured to execute program instructions and a memory storing instructions executable by the processing unit.

7. A bridge link battery interface for a helmet accessory mounting system, the bridge link battery interface comprising:
   a housing enclosing a circuit;
   an electrical and mechanical coupling interface structured and operable to connect to an attachment point on the helmet accessory mounting system;
   a first battery interface configured for detachable coupling to a first battery pack;
   a second battery interface configured for detachable coupling to a second battery pack;
   a first electrical connector assembly disposed on the housing and electrically coupled to the circuit;
   a second electrical connector assembly disposed on the housing and electrically coupled to the circuit;

wherein said circuit is operable to selectively electrically couple the first and second battery interfaces to the first and second electrical connector assemblies;

first and second adapters;

the first adapter having a first interface surface configured for removable attachment to the battery interface and a second interface surface configured for removable attachment to the first battery pack; and the second adapter having a third interface surface configured for removable attachment to the second battery interface and a fourth interface surface configured for removable attachment to the second battery pack;

wherein the first and second adapters are hinged.

8. The bridge link battery interface of claim 7, wherein the electrical and mechanical coupling interface is a hot shoe receptacle structured and operable to detachably connect to a hot shoe assembly on the helmet accessory mounting system.

9. The bridge link battery interface of claim 7, wherein the circuit is operable to couple the first electrical connector assembly to the second electrical connector assembly.

10. The bridge link battery interface of claim 7, wherein the circuit comprises a switch for selectively coupling a selected one of the first and second battery interfaces to the first and second electrical connector assemblies.

11. The bridge link battery interface of claim 7, in combination with the helmet accessory mounting system and a helmet.

12. The bridge link battery interface of claim 7, further comprising a processing unit configured to execute program instructions and a memory storing instructions executable by the processing unit.

13. A bridge link battery interface for a helmet accessory mounting system, the bridge link battery interface comprising:

a housing enclosing a circuit;

an electrical and mechanical coupling interface structured and operable to connect to an attachment point on the helmet accessory mounting system;

a first battery interface configured for detachable coupling to a first battery pack;

a second battery interface configured for detachable coupling to a second battery pack;

a first electrical connector assembly disposed on the housing and electrically coupled to the circuit;

a second electrical connector assembly disposed on the housing and electrically coupled to the circuit;

wherein said circuit is operable to selectively electrically couple the first and second battery interfaces to the first and second electrical connector assemblies;

the first electrical connector assembly configured to mate with a first ear bracket connector assembly on a first helmet ear accessory mounting bracket; and the second electrical connector assembly configured to mate with a second ear bracket connector assembly on a second helmet ear accessory mounting bracket.

14. The bridge link battery interface of claim 13, wherein the electrical and mechanical coupling interface is a hot shoe receptacle structured and operable to detachably connect to a hot shoe assembly on the helmet accessory mounting system.

15. The bridge link battery interface of claim 13, wherein the circuit is operable to couple the first electrical connector assembly to the second electrical connector assembly.

16. The bridge link battery interface of claim 13, wherein the circuit comprises a switch for selectively coupling a selected one of the first and second battery interfaces to the first and second electrical connector assemblies.

17. The bridge link battery interface of claim 13, further comprising first and second adapters;

the first adapter having a first interface surface configured for removable attachment to the battery interface and a second interface surface configured for removable attachment to the first battery pack; and the second adapter having a third interface surface configured for removable attachment to the second battery interface and a fourth interface surface configured for removable attachment to the second battery pack.

18. The bridge link battery interface of claim 13, wherein the circuit is configured to electrically bridge the first and second helmet ear accessory mounting brackets.

19. The bridge link battery interface of claim 18, wherein the circuit is configured to transmit one or both of data and control signals between the first and second helmet ear accessory mounting brackets.

20. The bridge link battery interface of claim 19, in combination with the helmet accessory mounting system.

21. The bridge link battery interface of claim 20, wherein the helmet accessory mounting system comprises the first and second ear brackets.

22. The bridge link battery interface of claim 20, wherein the helmet accessory mounting system comprises a helmet-mounted identification friend foe (IFF) emitter electrically coupled to the circuit.

23. The bridge link battery interface of claim 13, in combination with the helmet accessory mounting system and a helmet.

24. The bridge link battery interface of claim 13, further comprising a processing unit configured to execute program instructions and a memory storing instructions executable by the processing unit.

25. A bridge link battery interface in combination with a helmet accessory mounting system and a helmet, the bridge link battery interface comprising:

a housing enclosing a circuit;

an electrical and mechanical coupling interface structured and operable to connect to an attachment point on the helmet accessory mounting system;

a first battery interface configured for detachable coupling to a first battery pack;

a second battery interface configured for detachable coupling to a second battery pack;

a first electrical connector assembly disposed on the housing and electrically coupled to the circuit;

a second electrical connector assembly disposed on the housing and electrically coupled to the circuit;

wherein said circuit is operable to selectively electrically couple the first and second battery interfaces to the first and second electrical connector assemblies;

wherein the attachment point is a hot shoe interface disposed on a rear of the helmet, and further wherein the helmet accessory mounting system includes:

a front shroud;

a cable cover extending between the front shroud and between and the electrical hot shoe interface; and circuitry within the cable cover for routing power, data, and control signals to the front shroud.

26. The bridge link battery interface of claim 25, wherein the electrical and mechanical coupling interface is a hot shoe receptacle structured and operable to detachably connect to a hot shoe assembly on the helmet accessory mounting system.

27. The bridge link battery interface of claim 25, wherein the circuit is operable to couple the first electrical connector assembly to the second electrical connector assembly.

28. The bridge link battery interface of claim 25, wherein the circuit comprises a switch for selectively coupling a selected one of the first and second battery interfaces to the first and second electrical connector assemblies.

29. The bridge link battery interface of claim 25, further comprising first and second adapters;

the first adapter having a first interface surface configured for removable attachment to the battery interface and a second interface surface configured for removable attachment to the first battery pack; and the second adapter having a third interface surface configured for removable attachment to the second battery interface and a fourth interface surface configured for removable attachment to the second battery pack.

30. The bridge link battery interface of claim 25, further comprising a processing unit configured to execute program instructions and a memory storing instructions executable by the processing unit.

31. A bridge link battery interface for a helmet accessory mounting system, the bridge link battery interface comprising:

a housing enclosing a circuit;

an electrical and mechanical coupling interface structured and operable to connect to an attachment point on the helmet accessory mounting system;

a first battery interface configured for detachable coupling to a first battery pack;

a second battery interface configured for detachable coupling to a second battery pack;

a first electrical connector assembly disposed on the housing and electrically coupled to the circuit;

a second electrical connector assembly disposed on the housing and electrically coupled to the circuit;

wherein said circuit is operable to selectively electrically couple the first and second battery interfaces to the first and second electrical connector assemblies;

a processing unit configured to execute program instructions and a memory storing instructions executable by the processing unit;

wherein the processing unit is disposed within a modular processing board cartridge which is detachably coupled to the bridge link battery interface housing.

32. The bridge link battery interface of claim 31, wherein the electrical and mechanical coupling interface is a hot shoe receptacle structured and operable to detachably connect to a hot shoe assembly on the helmet accessory mounting system.

33. The bridge link battery interface of claim 31, wherein the circuit is operable to couple the first electrical connector assembly to the second electrical connector assembly.

34. The bridge link battery interface of claim 31, wherein the circuit comprises a switch for selectively coupling a selected one of the first and second battery interfaces to the first and second electrical connector assemblies.

35. The bridge link battery interface of claim 31, further comprising first and second adapters;

the first adapter having a first interface surface configured for removable attachment to the battery interface and a second interface surface configured for removable attachment to the first battery pack; and the second adapter having a third interface surface configured for removable attachment to the second battery interface and a fourth interface surface configured for removable attachment to the second battery pack.

36. The bridge link battery interface of claim 31, in combination with the helmet accessory mounting system and a helmet.

37. The bridge link battery interface of claim 31, further comprising one or both of:

an RF communication interface configured to receive programming data wirelessly and store the programming data in the memory for configuring one or more operational parameters of the modular processing board cartridge; and an RFID reader configured to communicate with an RFID token or tag, wherein the processing unit is further configured to receive programming data from the RFID token or tag via the RFID reader and store the programming data in the memory for configuring one or more operational parameters of the modular processing board cartridge.

* * * * *